United States Patent
Yun et al.

(10) Patent No.: US 8,558,961 B2
(45) Date of Patent: Oct. 15, 2013

(54) DISPLAY DEVICE AND LENTICULAR SHEET OF THE DISPLAY DEVICE

(75) Inventors: Hae-Young Yun, Suwon-si (KR); Kyung-Ho Jung, Yongin-si (KR); Seung-Hoon Lee, Hwaseong-si (KR); Hee-Seop Kim, Hwaseong-si (KR); Kyung-Bae Kim, Yongin-si (KR); Jin-Hwan Kim, Suwon-si (KR); Sung-Woon Kim, Suwon-si (KR); JianGang Lu, Suwon-si (KR)

(73) Assignee: Samsung Display Co., Ltd. (KR)

( * ) Notice: Subject to any disclaimer, the term of this patent is extended or adjusted under 35 U.S.C. 154(b) by 220 days.

(21) Appl. No.: 13/048,182

(22) Filed: Mar. 15, 2011

(65) Prior Publication Data

US 2011/0164318 A1 Jul. 7, 2011

Related U.S. Application Data

(63) Continuation-in-part of application No. 12/425,549, filed on Apr. 17, 2009, now Pat. No. 8,149,348.

(30) Foreign Application Priority Data

Apr. 22, 2008 (KR) .................. 10-2008-0037267
Oct. 22, 2010 (KR) .................. 10-2010-0103533

(51) Int. Cl.
*G02F 1/1335* (2006.01)

(52) U.S. Cl.
USPC .......................................................... 349/57

(58) Field of Classification Search
None
See application file for complete search history.

(56) References Cited

U.S. PATENT DOCUMENTS

| | | | | |
|---|---|---|---|---|
| 4,686,519 A * | 8/1987 | Yoshida et al. | | 345/88 |
| 4,959,641 A * | 9/1990 | Bass et al. | | 345/6 |
| 5,398,125 A * | 3/1995 | Willett et al. | | 349/95 |
| 5,808,599 A * | 9/1998 | Allio | | 345/6 |
| 6,859,240 B1 * | 2/2005 | Brown et al. | | 349/15 |
| 7,019,801 B2 * | 3/2006 | Ueki et al. | | 349/113 |
| 7,091,652 B2 * | 8/2006 | Morley et al. | | 313/110 |
| 7,450,188 B2 * | 11/2008 | Schwerdtner | | 349/15 |
| 7,551,353 B2 * | 6/2009 | Kim et al. | | 359/462 |
| 7,679,691 B2 | 3/2010 | Tomizuka et al. | | |
| 7,969,463 B2 * | 6/2011 | Takaki | | 348/59 |
| 2008/0158344 A1 * | 7/2008 | Schechterman et al. | | 348/46 |
| 2008/0180587 A1 * | 7/2008 | Tomizuka et al. | | 349/15 |
| 2008/0259233 A1 * | 10/2008 | Krijn et al. | | 349/15 |
| 2009/0256997 A1 * | 10/2009 | Misono et al. | | 349/64 |

FOREIGN PATENT DOCUMENTS

| | | |
|---|---|---|
| CN | 101236324 A | 8/2008 |
| JP | 2006072213 A | 3/2006 |
| KR | 1020060039707 A | 5/2006 |
| KR | 1020070013922 A | 1/2007 |

OTHER PUBLICATIONS

Chinese Office action dated Apr. 27, 2012 for Application 200910135055.2.

* cited by examiner

*Primary Examiner* — Sung Pak
(74) *Attorney, Agent, or Firm* — Cantor Colburn LLP

(57) ABSTRACT

A display device includes a display panel on which a plurality of pixels are arranged in a matrix in a first direction and in a second direction intersecting the first direction, and a lenticular sheet which is disposed above the display panel and includes a plurality of polygonal prism lenses that are arranged in the second direction. Each of the polygonal prism lenses extends in a third direction intersecting the second direction, and includes a plurality of flat surfaces or curved surfaces.

20 Claims, 20 Drawing Sheets

DISPLAY DEVICE AND LENTICULAR SHEET OF THE DISPLAY DEVICE

CROSS REFERENCES TO RELATED APPLICATIONS

This application is a continuation-in-part application of U.S. application Ser. No. 12/425,549, filed Apr. 17, 2009, which claims priority from Korean Patent Application Nos. 10-2008-0037267 filed Apr. 22, 2008 and 10-2010-0103533 filed Oct. 22, 2010, and all the benefits accruing therefrom under 35 U.S.C. §119, the disclosures of which is incorporated herein by reference in their entirety.

BACKGROUND OF THE INVENTION

1. Field of the Invention

The present invention relates to a display device and a lenticular sheet of the display device, and more particularly, to a display device, which can prevent three-dimensional ("3D") image crossing, improve the uniformity of the distribution of luminance and thus enhance the quality of a 3D image, and a lenticular sheet of the display device.

2. Description of the Related Art

In recent years, there has been an increasing demand for flat panel display devices such as plasma display panel ("PDP") devices, plasma-addressed liquid crystal ("PALC") display panel devices, liquid crystal display ("LCD") devices and organic light-emitting diode ("OLED") devices, since conventional cathode ray tube ("CRT") devices cannot meet the demand for thin and large-scale display devices.

Additionally, the overall quality of images displayed by display devices has been considerably improved, and display devices capable of displaying not only two-dimensional ("2D") images but also three-dimensional ("3D") images have been developed. Such stereoscopic display devices can provide 3D images using the fact that the left and right eyes see slightly different images.

Methods of displaying 3D images may involve the use of special glasses, holograms, a lenticular sheet or a barrier.

In methods of displaying 3D images using a lenticular sheet, a 2D image of an object is divided into an image for the right eye and an image for the left eye by using a lenticular sheet, thereby enabling the object to be perceived three-dimensionally using the differences between the image for the right eye and the image for the left eye.

However, conventional methods of displaying 3D images using a lenticular sheet may result in a black matrix moire phenomenon, in which black matrices are viewed at regular intervals of time, and may thus lower the luminance of 3D images, narrow viewing angles, cause color bleeding and eventually lower the overall quality of 3D images.

BRIEF SUMMARY OF THE INVENTION

The present invention provides a display device which can prevent three-dimensional ("3D") image crossing, improve the uniformity of the distribution of luminance and thus enhance the quality of a 3D image, and a lenticular sheet of the display device.

However, the aspects, features and advantages of the present invention are not restricted to the ones set forth herein. The above and other aspects, features and advantages of the present invention will become more apparent to one of ordinary skill in the art to which the present invention pertains by referencing a detailed description of the present invention given below.

According to an exemplary embodiment of the present invention, there is provided a display device including a display panel on which a plurality of pixels are arranged in a matrix in a first direction and in a second direction intersecting the first direction, and a lenticular sheet which is disposed above the display panel and includes a plurality of polygonal prism lenses that are arranged in the second direction. Each of the polygonal prism lenses extends in a third direction intersecting the second direction and includes a plurality of flat surfaces or curved surfaces.

According to another exemplary embodiment of the present invention, there is provided a display device including a display panel on which a plurality of pixels are arranged in a matrix in a first direction and in a second direction intersecting the first direction, and a lenticular sheet which is disposed above the display panel and includes a plurality of polygonal prism lenses that are arranged in the second direction. Each of the polygonal prism lenses extends in a third direction intersecting the second direction, and the third direction is parallel to a diagonal direction of the pixels.

According to still another exemplary embodiment of the present invention, there is provided a lenticular sheet including a base, and a polygonal prism lens which is disposed above the base and extends in a specific direction. The polygonal prism lens includes a plurality of flat surfaces and curved surfaces extending in the specific direction.

According to still another exemplary embodiment of the present invention, there is provided a lenticular sheet including a base, and a polygonal prism lens which is disposed above the base and extends in a specific direction. An extending direction of the polygonal prism lens is parallel to a diagonal direction of pixels of a display panel arranged under the lenticular sheet.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE INVENTION

Figure 1:
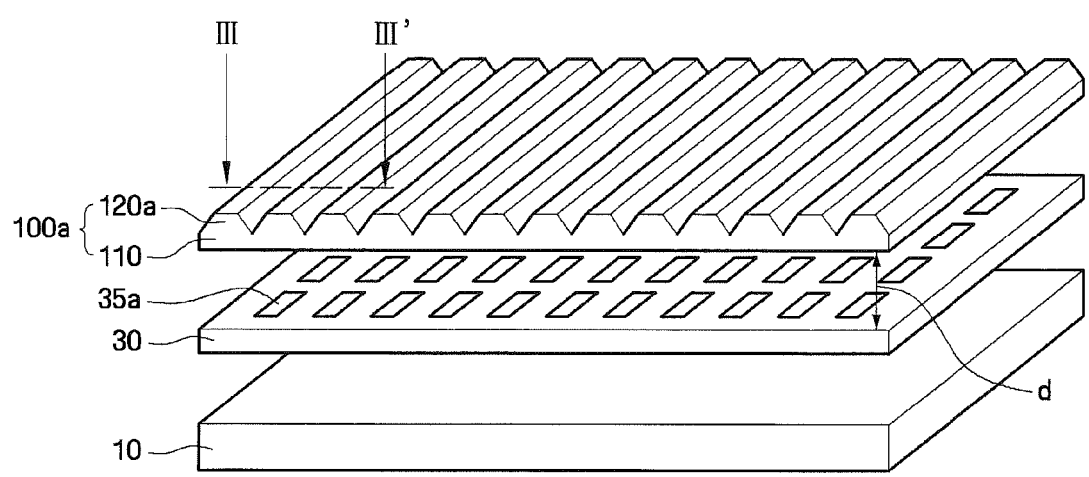
FIG. 1 illustrates an exploded perspective view of an exemplary embodiment of a display device according to the present invention.

The present invention will now be described more fully with reference to the accompanying drawings, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, like reference numerals indicate like elements, and thus, detailed descriptions thereof will be skipped. In the drawings, the size and relative sizes of layers and regions may be exaggerated for clarity.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "below," "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

An exemplary embodiment of a display device according to the present invention will hereinafter be described in detail with reference to FIGS. 1 through 4C.

Figure 2:
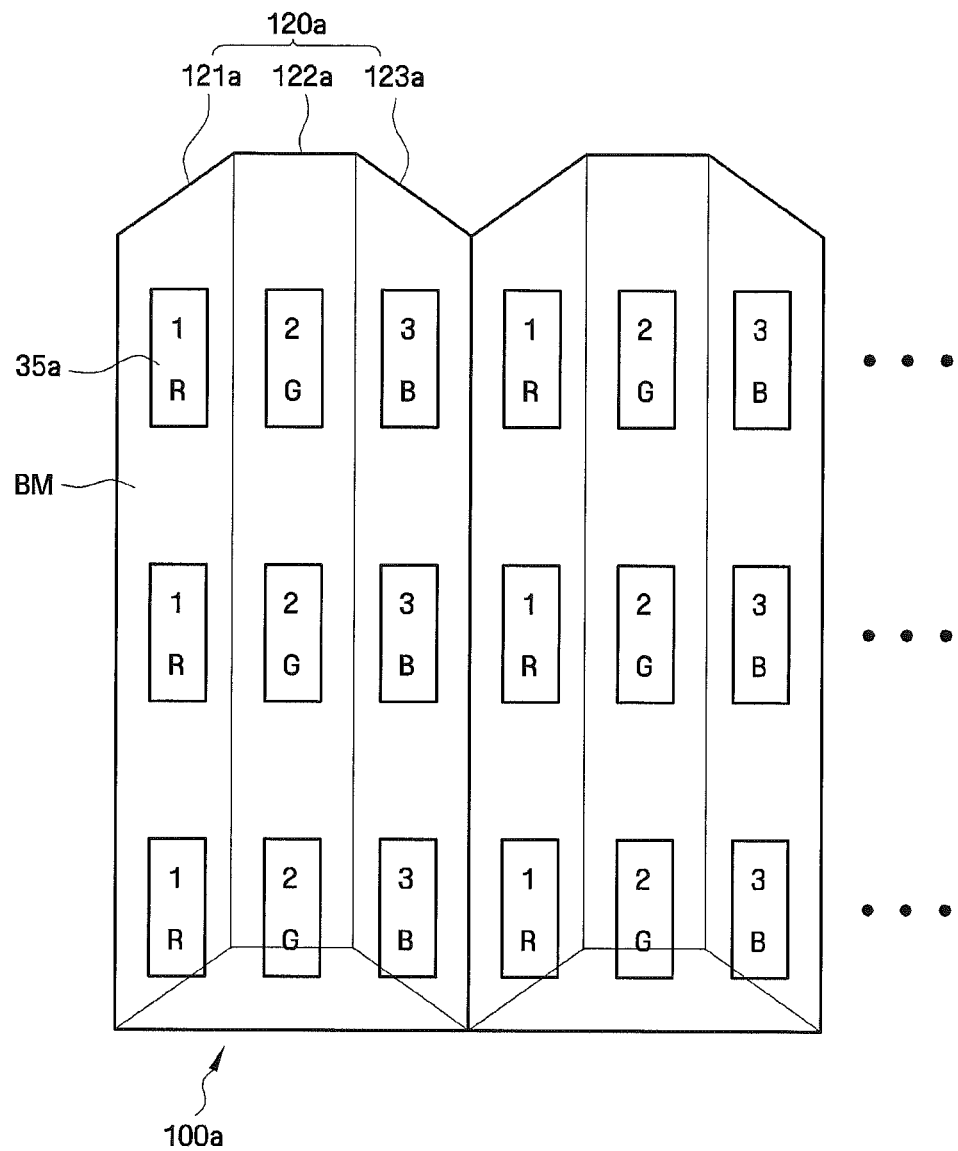
FIG. 2 illustrates a plan view of an exemplary embodiment of a portion of a lenticular sheet illustrated in FIG. 1, and a plurality of pixels that underlie the lenticular sheet.
Figure 3:
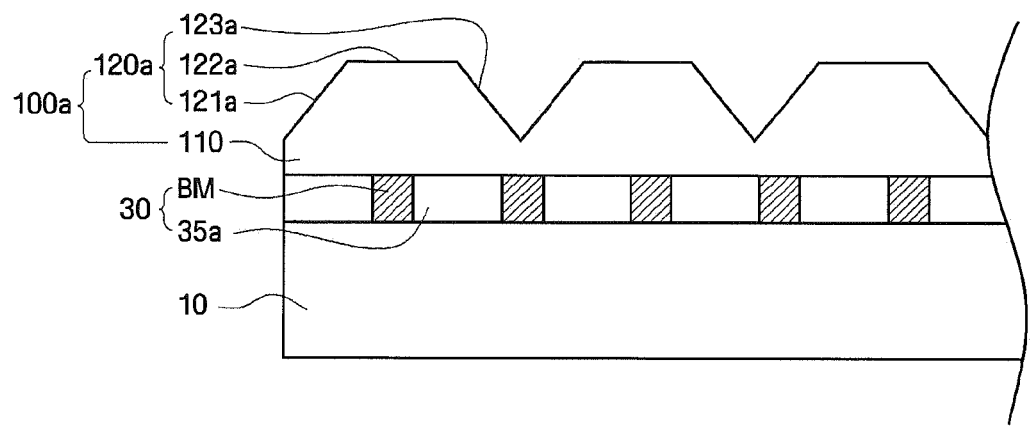
FIG. 3 illustrates a cross-sectional view taken along line III-III' of FIG. 1.

FIG. 1 illustrates an exploded perspective view of the exemplary embodiment of a display device according to the present invention, FIG. 2 illustrates a plan view of a portion of a lenticular sheet 100*a* illustrated in FIG. 1 and a plurality of pixels 35*a* that underlie the lenticular sheet 100*a*, FIG. 3 illustrates a cross-sectional view taken along line III-III' of FIG. 1, and FIGS. 4A through 4C illustrate diagrams for explaining various optical paths for different observation positions, from which the lenticular sheet 100a is observed.

Referring to FIG. 1, the display device 1 includes the lenticular sheet 100a, a display panel 30 and a backlight assembly 10.

The lenticular sheet 100a enables a plurality of pixels 35a on the display panel 30 to be selectively recognizable according to an observation position. The lenticular sheet 100a may include a base 110 and a plurality of polygonal prism lenses 120a, which are on a top surface of the base 110. The polygonal prism lenses 120a may be longitudinally extended in a direction perpendicular to a direction in which the pixels 35a are arranged in the plan view, or may be extended at an inclination to the direction in which the pixels 35a are arranged.

The base 110, which is part of the lenticular sheet 100a, maintains the shape of the polygonal prism lenses 120a. The base 110 may include a transparent material, and may be formed in one body with the polygonal prism lenses 120a, such that the lenticular sheet 100a is a single, unitary indivisible member as illustrated in FIG. 1.

The polygonal prism lenses 120a protrude from the top surface or a bottom surface of the base 110, and extend over the base 110 along a predetermined direction, such as extending over an entire width of the base 110. The polygonal prism lenses 120a may be obtained by appropriately cutting or may be formed from cylinder lenses or elliptical cylinder lenses. The polygonal prism lenses 120a may be multifocal lenses or may have a plurality of cut surfaces. The lenticular sheet 100a will be described later in further detail.

The display panel 30 displays an image and includes the pixels 35a. The pixels 35a are arranged on the display panel 30 in a matrix, in the plan view. That is, the pixels 35a are uniformly arranged horizontally and vertically (e.g., longitudinally and transversely) according to a predetermined rule. Each of the pixels 35a may form a pixel of an image, and may represent one of red, green and blue. The display panel 30 may be a plasma display panel ("PDP"), a plasma address liquid crystal display panel ("PALC"), a liquid crystal display ("LCD") panel, or an organic light-emitting diode ("OLED") panel. For convenience, the exemplary embodiment assumes that the display panel 30 is an LCD panel. A distance d between the lenticular sheet 100a and the display panel 30 including the pixels 35a is taken in a direction perpendicular to the lenticular sheet 100a and/or the display panel 30.

The backlight assembly 10 is disposed below and overlapping the display panel 30. That is, since the display panel 30 is a passive display panel such as an LCD panel which requires an additional light source, the backlight assembly 10 may be disposed below the display panel 30 and may provide light to the display panel 30.

The display panel 30 may display various images by being provided with light by the backlight assembly 10. Due to the lenticular sheet 100a, an image displayed by the display panel 30 may appear different to a viewer according to the viewpoint of the viewer.

The polygonal prism lenses 120a and the pixels 35a will hereinafter be described in further detail with reference to FIGS. 2 and 3.

Referring to FIG. 2, a plurality of pixels 35a may be uniformly arranged in a matrix. Each of the pixels 35a may represent one of a plurality of colors. A group of adjacent pixels 35a may display different images obtained from different angles.

The lenticular sheet 100a is disposed over the pixels 35a. The pixels 35a may be viewed through the polygonal prism lenses 120a of the lenticular sheet 100a. Each of the polygonal prism lenses 120a may have a plurality of flat surfaces, for example, first, second and third surfaces 121a, 122a and 123a. The first, second and third surfaces 121a, 122a and 123a of each of the polygonal prism lenses 120a may not necessarily be flat. That is, the first, second and third surfaces 121a, 122a and 123a of each of the polygonal prism lenses 120a may be curved.

The first and third surfaces 121a and 123a extend directly from an upper (e.g., top) surface of the base 110, and extend inclined from the upper surface. The second surface 122a connects the first and third surface 121a and 123a to each other.

The focal distance of each of the polygonal prism lenses 120a may coincide with a number of pixels 35a to be viewed. Each of the polygonal prism lenses 120a may have different focal distances from one portion to another. The angles between the first and second surfaces 121a and 122a of each of the polygonal prism lenses 120a and between the second and third surfaces 122a and 123a of each of the polygonal prism lenses 120a may be appropriately determined according to the refractive index of the polygonal prism lenses 120a and the position of and the distance from a viewer.

A plurality of pixels 35a may be arranged in a matrix below the polygonal prism lenses 120a. Black matrices BM may be among the pixels 35a (e.g., between adjacent pixels 35a) and may block the transmission of light. The polygonal prism lenses 120a may form multiple viewpoints in a direction parallel to an axial direction of the polygonal prism lenses 120a. That is, the polygonal prism lenses 120a may be formed such that different pixels 35a can be seen according to an observation point, from which each of the polygonal prism lenses 120a is observed. In order to form multiple viewpoints, a plurality of pixels 35c may be overlapped by each of the polygonal prism lenses 120a along a direction perpendicular to the axial direction of the polygonal prism lenses 120a, thereby enabling different pixels 35a to be able to be seen according to an observation angle with which each of the polygonal prism lenses 120a is observed. A number of pixels 35a corresponding to the number of surfaces of each of the polygonal prism lenses 120a may be overlapped by each of the polygonal prism lens 120a along the direction perpendicular to the axial direction of the polygonal prism lenses 120a. The polygonal prism lenses 120a may be lenses with a variable refractive index such as liquid crystal lenses or fluid lenses. In this case, it is possible to display both two-dimensional ("2D") images and three-dimensional ("3D") images, to facilitate the adjustment of multiple viewpoints, and thus to vividly display images.

Figure 4A:
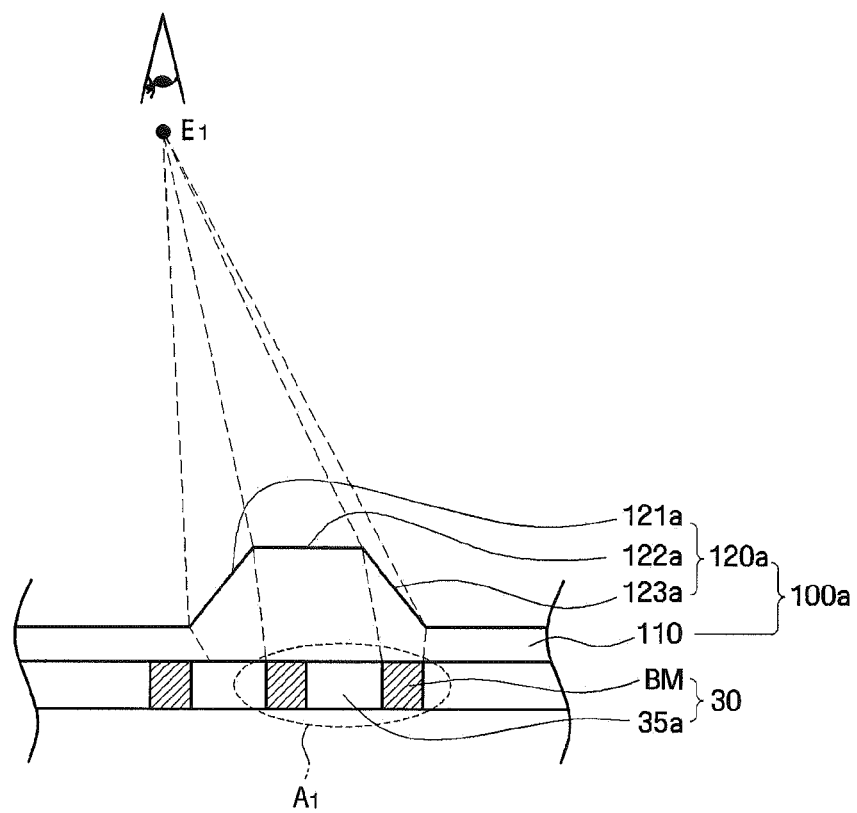
FIGS. 4A through 4C illustrate diagrams for explaining various optical paths for different observation positions, from which the lenticular sheet shown in FIG. 1 is observed.

Referring to FIG. 4A, when a viewer views a polygonal prism lens 120a from a position $E_1$, which is on the left of the polygonal prism lens 120a, an area $A_1$ on the display panel 30 can be seen through the polygonal prism lens 120a. The area $A_1$ accounts for a right part of the overlapping area of the polygonal prism lens 120a and the display panel 30. A pixel 35a to be observed may be formed in the area $A_1$. Then, the pixel 35a to be observed, black matrices BM that surround the pixel 35a to be observed, and part of a pixel 35a adjacent to the pixel 35a to be observed can be seen through the polygonal prism lens 120a.

Figure 4B:
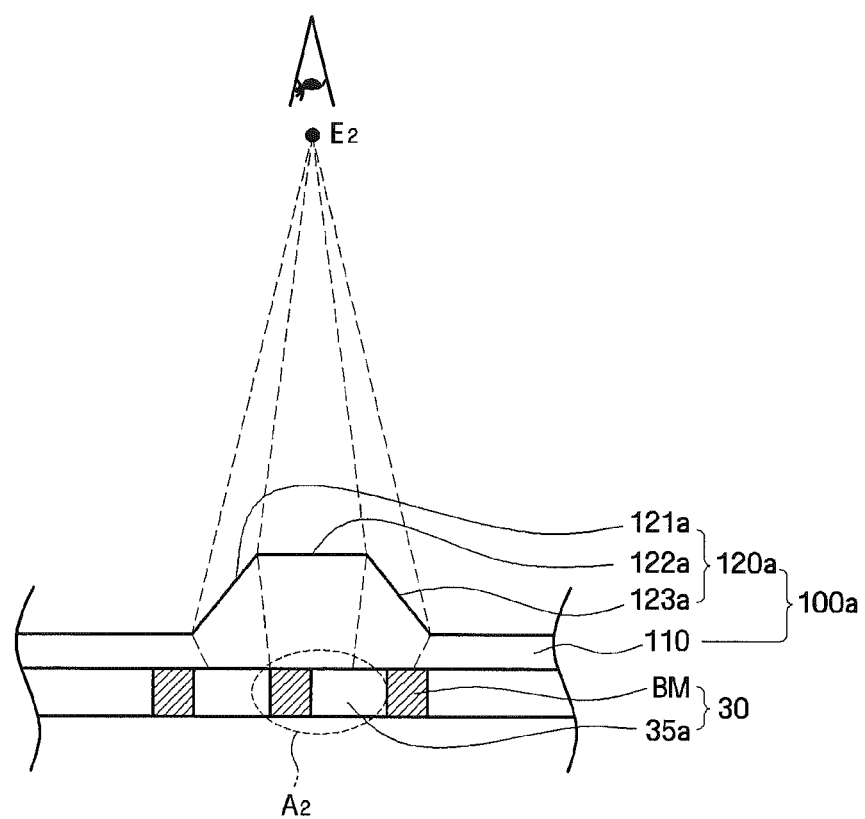

Referring to FIG. 4B, when the viewer views the polygonal prism lens 120a from a position $E_2$, which is directly above the center of the polygonal prism lens 120a, an area $A_2$ on the display panel 30 can be seen through the polygonal prism lens 120a. The area $A_2$ accounts for a middle part of the overlapping area of the polygonal prism lens 120a and the display panel 30. A pixel 35a to be observed and a black matrix BM that defines a boundary of the pixel 35a to be observed may be formed in the area $A_2$. Then, the pixel 35a to be observed, black matrices BM that surround the pixel 35a to be observed, and part of a pixel 35a adjacent to the pixel 35a to be observed can be seen through the polygonal prism lens 120a.

Figure 4C:
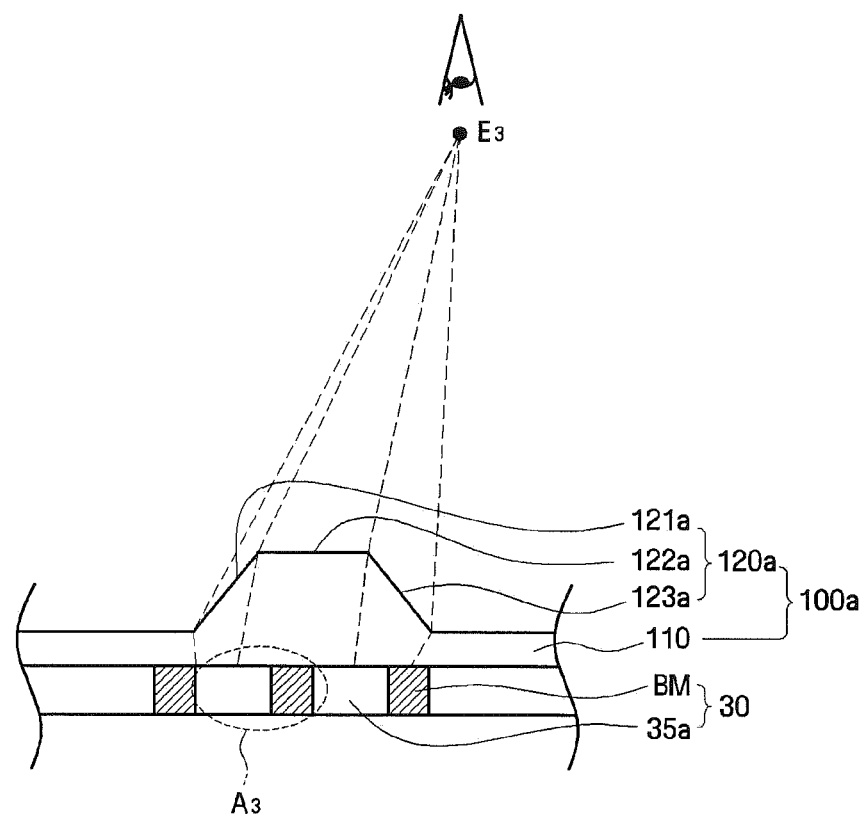

Referring to FIG. 4C, when the viewer views the polygonal prism lens 120a from a position $E_3$, which is on the right side of the polygonal prism lens 120a, an area $A_3$ on the display panel 30 can be seen through the polygonal prism lens 120a. The area $A_3$ accounts for a left part of the overlapping area of the polygonal prism lens 120a and the display panel 30. A pixel 35a to be observed may be formed in the area $A_3$. Then, the pixel 35a to be observed, black matrices BM that surround the pixel 35a to be observed, and part of a pixel 35a adjacent to the pixel 35a to be observed can be seen through the polygonal prism lens 120a.

Referring to FIGS. 4A through 4C, a main image may appear differently according to an observation angle with which the viewer views the polygonal prism lens 120a. Therefore, if the left and right eyes of the viewer are at the positions $E_1$ and $E_3$, respectively, a main image may appear differently to each of the left and right eyes of the viewer. It is possible for the viewer to stereoscopically perceive an object by providing the viewer with a plurality of images of an object viewed from different positions on the display panel 30.

It is possible to adjust an image to be seen from each position by adjusting the angles between the first and second surfaces 121a and 122a of each of the polygonal prism lenses 120a, and between the second and third surfaces 122a and 123a of each of the polygonal prism lenses 120a, or designing the polygonal prism lenses 120a to have more than three surfaces. In one exemplary embodiment, for example, an overlapping region may be provided between two images that can be respectively seen from a pair of adjacent positions, thereby reducing or effectively preventing drastic change an image according to the position of a viewer, and reducing or effectively preventing the occurrence of a black matrix moire phenomenon, in which only the black matrices BM among the pixels 35a are seen.

It is possible to provide the display device 1 having multiple viewpoints and to provide more realistic 3D images by appropriately altering the arrangement of the polygonal prism lenses 120a and the arrangement of the pixels 35a below the polygonal prism lenses 120a. The display device 1 having multiple viewpoints may display moving images.

Figure 5A:
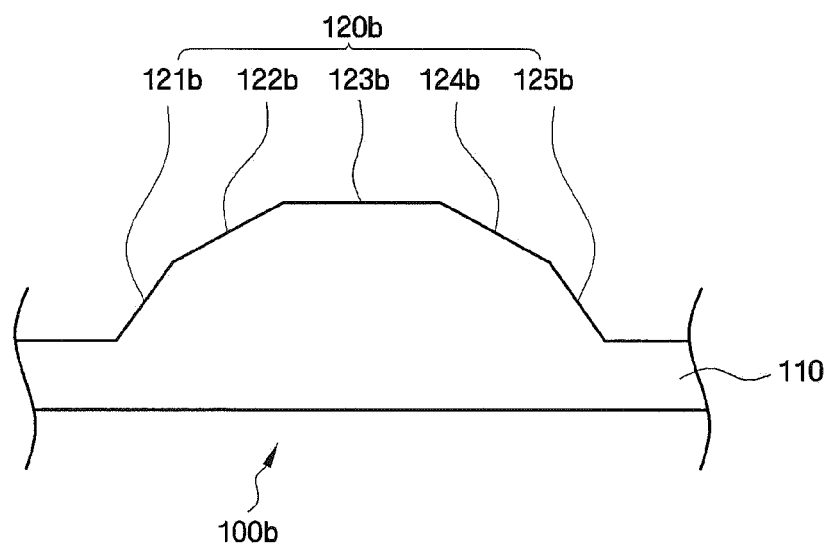
FIG. 5A illustrates a diagram of a variation of the exemplary embodiment of the lenticular sheet shown in FIG. 1.
Figure 5B:
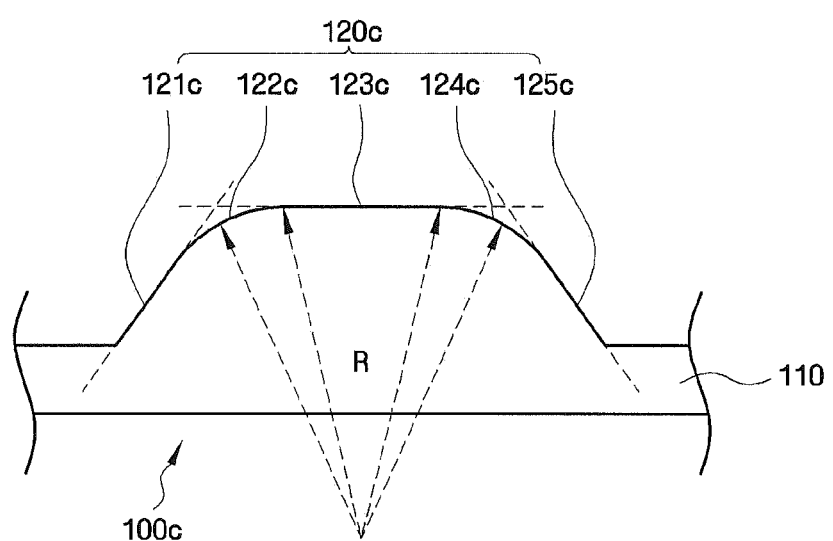
FIG. 5B illustrates a diagram of another variation of the exemplary embodiment of the lenticular sheet shown in FIG. 1.
Figure 5C:
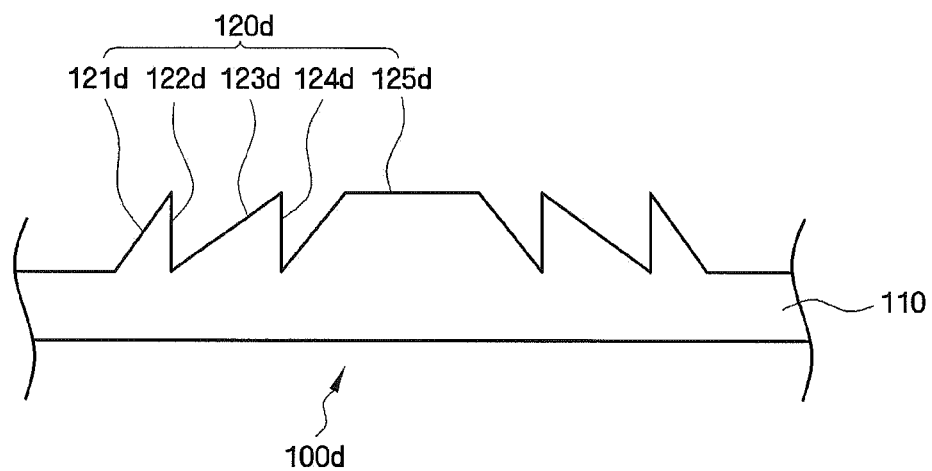
FIG. 5C illustrates a diagram of another variation of the exemplary embodiment of the lenticular sheet shown in FIG. 1.
Figure 5D:
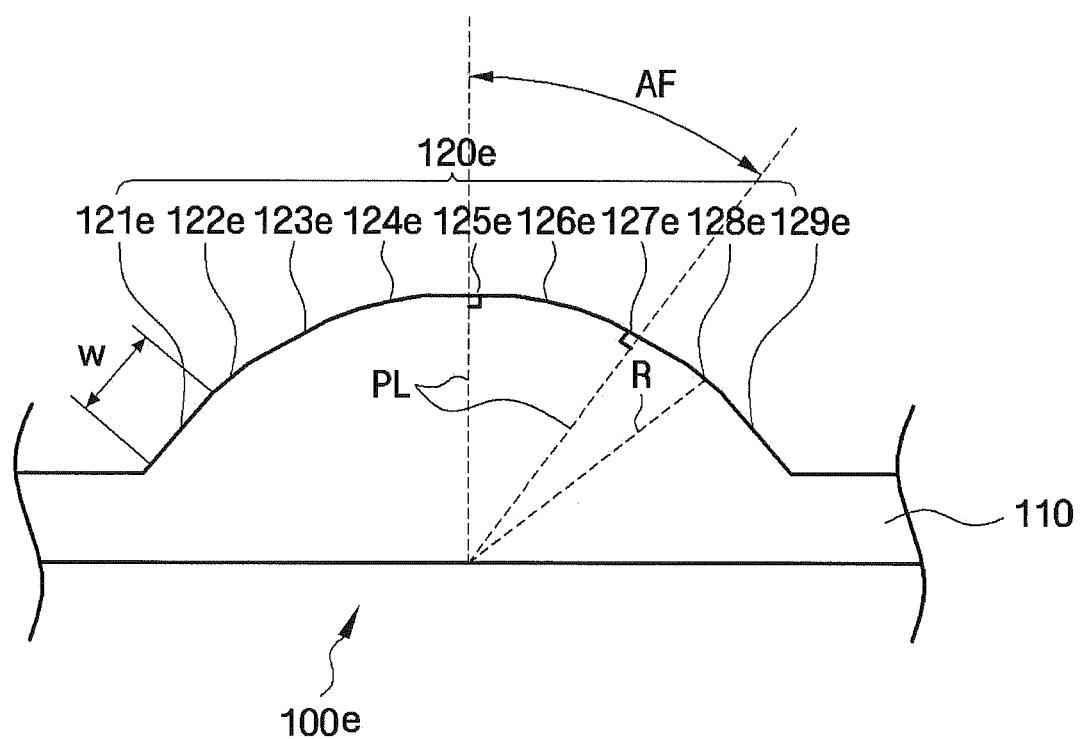
FIG. 5D illustrates a diagram of still another variation of the exemplary embodiment of the lenticular sheet shown in FIG. 1.

Variations of the exemplary embodiment of the lenticular sheet 100a of the display device 1 of FIGS. 1 through 4C will hereinafter be described in detail with reference to FIGS. 5A through 5D. FIG. 5A illustrates a diagram of a variation of the lenticular sheet 100a, e.g., a lenticular sheet 100b, FIG. 5B illustrates a diagram of another variation of the lenticular sheet 100a, e.g., a lenticular sheet 100c, and FIG. 5C illustrates a diagram of still another variation of the lenticular sheet 100a, e.g., a lenticular sheet 100d. FIG. 5D illustrates a diagram of still another variation of the lenticular sheet 100a, e.g., a lenticular sheet 100e. In FIGS. 1 through 5D, like reference numerals indicate like elements, and thus, detailed descriptions thereof will be skipped.

Referring to FIG. 5A, the lenticular sheet 100b includes a polygonal prism lens 120b which has first, second, third, fourth and fifth surfaces 121b, 122b, 123b, 124b, and 125b. The first, second, third, fourth and fifth surfaces 121b, 122b, 123b, 124b and 125b are all flat surfaces. Each of the first, second, third, fourth and fifth surfaces 121b, 122b, 123b, 124b and 125b refracts light toward a number of pixels 35a underlying the polygonal prism lens 120b. The polygonal prism lens 120b may form five viewpoints due to the first, second, third, fourth and fifth surfaces 121b, 122b, 123b, 124b and 125b. The first, second, third, fourth and fifth surfaces 121b, 122b, 123b, 124b and 125b may be technically flat, and thus, the absolute value of the radius of curvature of the first, second, third, fourth and fifth surfaces 121b, 122b, 123b, 124b and 125b may be indefinite. Alternatively, the radius of curvature of the first, second, third, fourth and fifth surfaces 121b, 122b, 123b, 124b and 125b may be at least two times greater than the radius of curvature of the polygonal prism lens 120b.

Referring to FIG. 5B, the lenticular sheet 100c includes a polygonal prism lens 120c having a slightly curved profile. That is, the polygonal prism lens 120c has first, second, third, fourth and fifth surfaces 121c, 122c, 123c, 124c and 125c. The first, third and fifth surfaces 121c, 123c and 125c are flat, and the second and fourth surfaces 122c and 124c are curved and are disposed between the first and third surfaces 121c and 123c and between the third and fifth surfaces 123c and 125c, respectively.

The absolute value of the radius of curvature of the first, third and fifth surfaces 121c, 123c, and 125c may be indefinite. Alternatively, the radius of curvature of the first, third and fifth surfaces 121c, 123c, and 125c may be at least two times greater than the radius of curvature of the polygonal prism lens 120c. The present invention is not restricted to the situation when the first, third and fifth surfaces 121c, 123c, and 125c have a convex profile and thus have a positive radius of curvature. That is, the first, third and fifth surfaces 121c, 123c, and 125c may have a concave profile, and may thus have a negative radius of curvature.

The second and fourth surfaces 122c and 124c are both curved surfaces. The radius of curvature of the second surface 122c may not necessarily be the same as the radius of curvature of the fourth surface 124c. The first, second, third, fourth and fifth surfaces 121c, 122c, 123c, 124c and 125c may have different radiuses of curvature. It is possible to adjust an image viewed from each observation position by appropriately adjusting the radiuses of curvature of the first, second, third, fourth and fifth surfaces 121c, 122c, 123c, 124c and 125c. Therefore, it is possible to reduce or effectively prevent the occurrence of a black matrix moire phenomenon and color bleeding.

The polygonal prism lens 120c includes three flat surfaces and two curved surfaces, but the number of the flat surfaces and the number of the curved surfaces may be modified. As shown in FIG. 5D, for example, the polygonal prism lens may include five flat surfaces and four curved surfaces.

Specifically, referring to FIG. 5D, each polygonal prism lens 120e of the lenticular sheet 100e has first, second, third, fourth, fifth, sixth, seventh, eighth and ninth surfaces 121e, 122e, 123e, 124e, 125e, 126e, 127e, 128e and 129e. The first, third, fifth, seventh and ninth surfaces 121e, 123e, 125e, 127e and 129e are flat, and the second, fourth, sixth and eighth surfaces 122e, 124e, 126e and 128e are curved and are formed between the first, third, fifth, seventh and ninth surfaces 121e, 123e, 125e, 127e and 129e, respectively.

As described in FIGS. 5A, 5B and 5D, when the polygonal prism lens includes a plurality of flat surfaces, it is possible to reduce or effectively prevent a black matrix moire phenomenon. This is because light rays passing through the curved surface converge into one point, whereas light rays passing through the flat surface are refracted toward one point, thereby increasing a focal width of the lens.

Referring to FIG. 5C, the lenticular sheet 100d may include a polygonal prism lens 120d, which is formed as a Fresnel lens. A Fresnel lens includes a plurality of convex or concave lenses having a predetermined height or depth. The polygonal prism lens 120d may have first, second, third, fourth and fifth surfaces 121d, 122d, 123d, 124d and 125d. The first and third surfaces 121d and 123d are slanted surfaces. The second and fourth surfaces 122d and 124d are vertical planes extending from the first and third surfaces 121d and 123d, respectively. Light refracted from a number of pixels 35a may be emitted through the first and third surfaces 121d and 123d. The second and fourth surfaces 122d and 124d may serve as total reflection surfaces and may thus reduce or effectively prevent light from leaking into a predetermined zone. The fifth surface 125d is a horizontal plane. The middle part of the polygonal prism lens 120d may be observed through the fifth surface 125d.

By forming the polygonal prism lens 120d as a Fresnel lens, it is possible to reduce the thickness of the lenticular sheet 100d and to improve the uniformity of height.

Where the polygonal prism lens 120c or 120e includes flat surfaces and curved surfaces as described with reference to FIGS. 5B and 5D, the flat surfaces and curved surfaces may be arranged under the following condition. The arrangement condition of the flat surfaces and curved surfaces will be described with reference to FIG. 5D.

Each polygonal prism lens includes two or more flat surfaces, which may be arranged alternately with curved surfaces. In one exemplary embodiment, for example, as shown in FIG. 5D, the polygonal prism lens 120e includes five flat surfaces, e.g., the first, third, fifth, seventh and ninth surfaces 121e, 123e, 125e, 127e and 129e, and four curved surfaces, each being arranged between the flat surfaces, e.g., the second, fourth, sixth and eighth surfaces 122e, 124e, 126e and 128e. However, the present invention is not limited thereto. The first, third, fifth, seventh and ninth surfaces 121e, 123e, 125e, 127e and 129e may be curved surfaces and the second, fourth, sixth and eighth surfaces 122e, 124e, 126e and 128e may be flat surfaces in a way opposite to the case of FIG. 5D. That is, the curved surfaces and the flat surfaces may be arranged alternately.

The flat surfaces may have substantially the same width W. The flat surfaces are arranged to satisfy an image formation condition. The image formation condition means that light rays passing through the respective flat surfaces converge at a predetermined focal distance to form a focus with a specific width. The focal distance may be larger than a distance between the polygonal prism lens and the pixel.

Further, the curved surfaces may have the same radius of curvature. In the illustrated embodiment, for example, as shown in FIG. 5D, the four curved surfaces, e.g., second, fourth, sixth and eighth surfaces 122e, 124e, 126e and 128e, may have the same radius of curvature R. In comparison with the curved surfaces, the absolute value of the radius of curvature of the flat surfaces may be indefinite. Alternatively, the radius of curvature of each of the flat surfaces may be at least two times greater than the radius of curvature R of the curved surfaces.

Further, the flat surfaces may be arranged such that normal lines PL of the flat surfaces converge into one point, and an angle AF between the normal lines of two adjacent flat surfaces is constant. The point into which the normal lines PL of the flat surfaces converge may be identical with a center of rotation of the curved surfaces having the constant radius of curvature R, within the polygonal prism lens 120e.

The above-described polygonal prism lenses may have a symmetrical structure with respect to a center of the lens in a horizontal direction perpendicular to an axial direction of the lens.

Figure 6A:
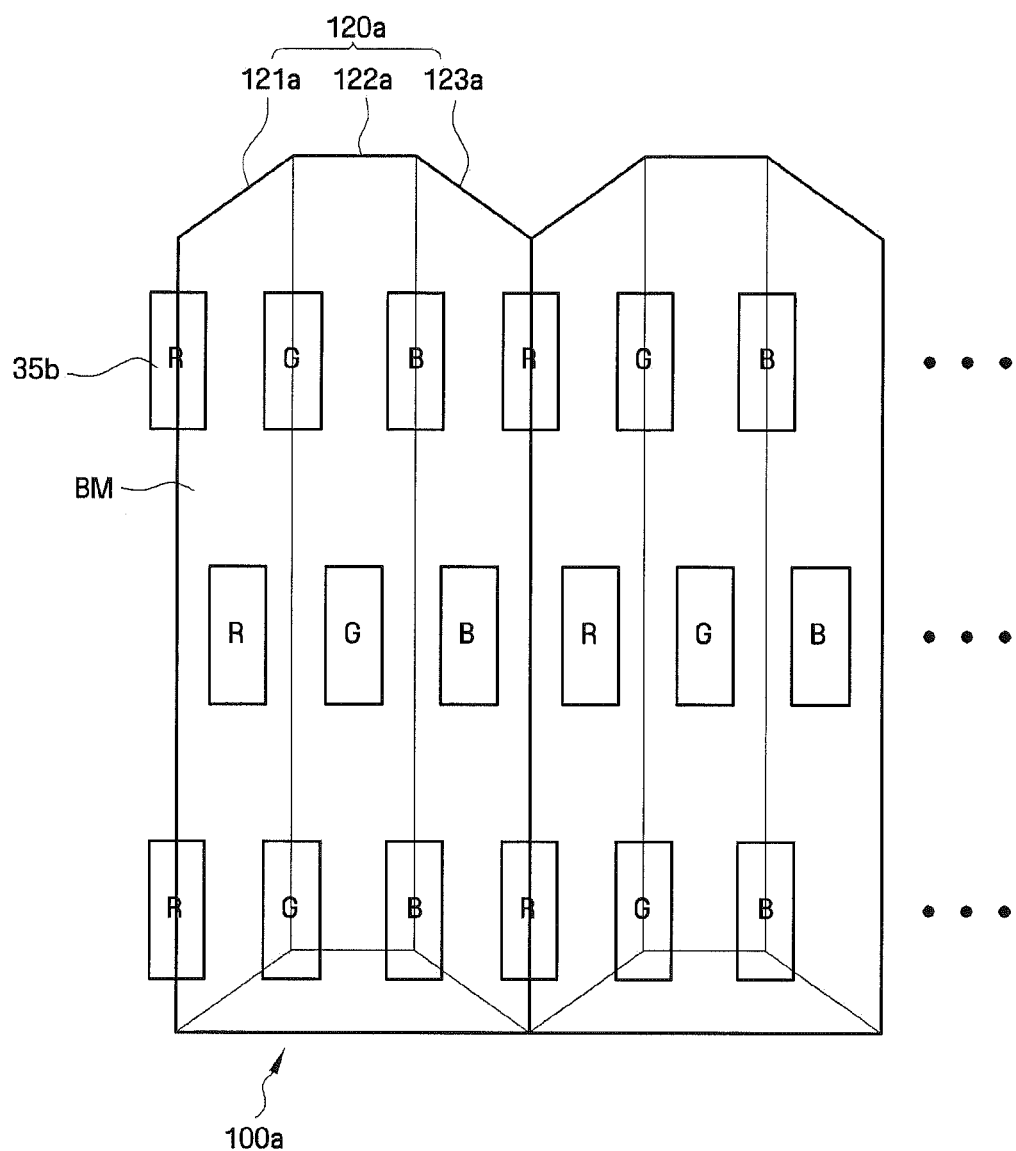
FIG. 6A illustrates a plan view of another exemplary embodiment of a portion of the lenticular sheet of the display device according to the present invention, and a plurality of pixels that underlie the lenticular sheet.
Figure 6B:
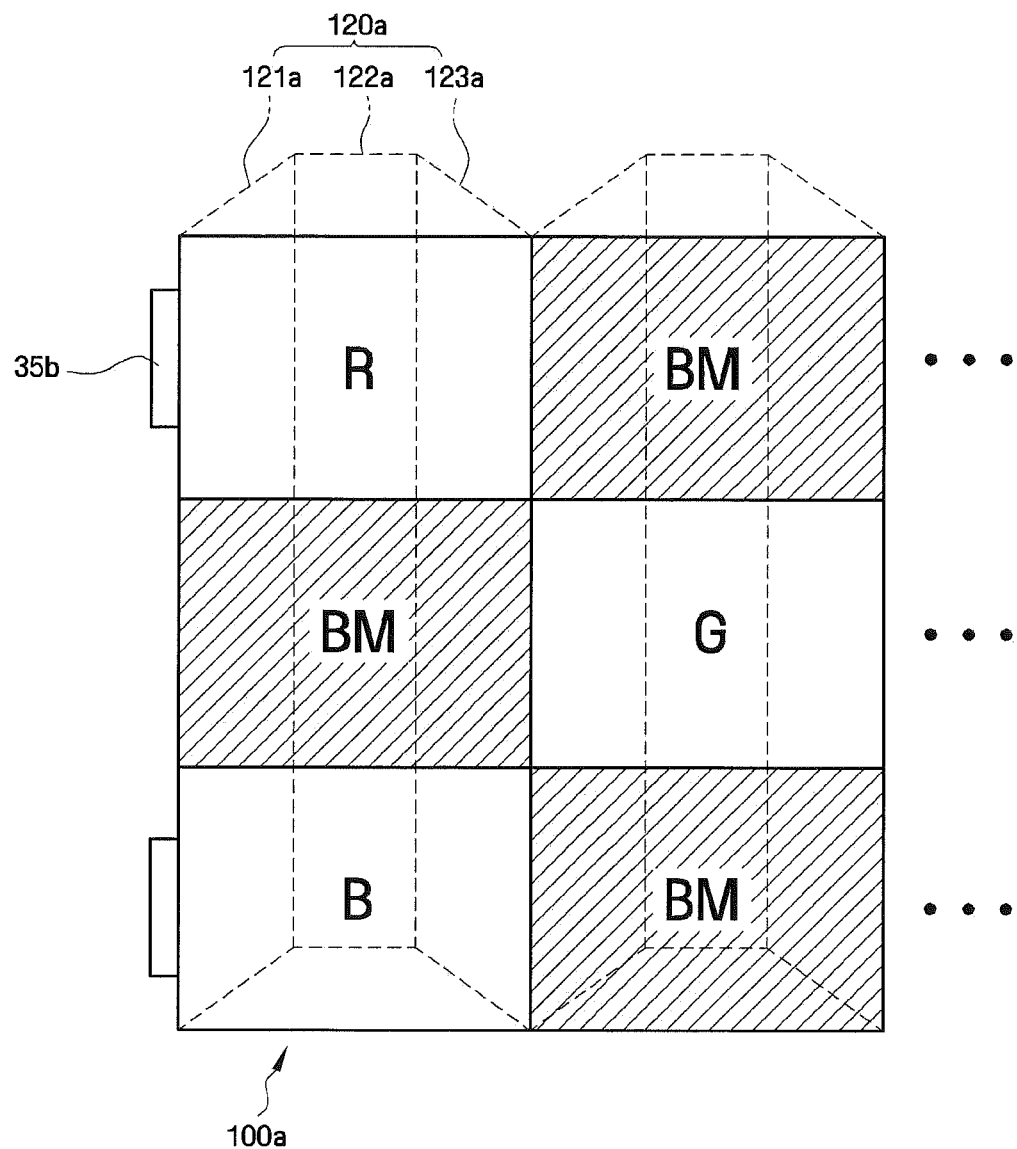
FIG. 6B illustrates a diagram for explaining what a plurality of pixels look like to the naked eye of a viewer when being viewed through the lenticular sheet shown in FIG. 6A.

Another exemplary embodiment of the display device according to the present invention will hereinafter be described in detail with reference to FIGS. 6A and 6B. FIG. 6A illustrates a plan view of another exemplary embodiment of a portion of the lenticular sheet 100a of the display device 1 according to the present invention, and a plurality of pixels 35b that underlie the lenticular sheet 100a, and FIG. 6B illustrates a diagram for explaining what the pixels 35b look like to the naked eye of a viewer when being viewed through the lenticular sheet 100a illustrated in FIG. 6A. In FIGS. 1 through 4C, 6A and 6B, like reference numerals indicate like elements, and thus, detailed descriptions thereof will be skipped.

In the embodiment of FIGS. 6A and 6B, a pair of vertically adjacent pixels 35b are misaligned with each other along the axial direction of a plurality of polygonal prism lenses 120a of the lenticular sheet 100a.

More specifically, referring to the plan view of FIG. 6A, the pair of vertically adjacent pixels 35b are misaligned with each other along the axial direction of the polygonal prism lenses 120a of the lenticular sheet 100a, whereas a pair of horizontally adjacent pixels 35b are aligned with each other along a direction perpendicular to the axial direction of the polygonal prism lenses 120a.

FIG. 6B illustrates a diagram for explaining what the pixels 35b look like when being viewed from a predetermined observation point through the polygonal prism lenses 120a illustrated in FIG. 6A. Referring to FIG. 6B, each of the pixels 35b appears to be large enough to have the same width as that of the polygonal prism lenses 120a when being viewed through the lenticular sheet 100a illustrated in FIG. 6A. An image that can be seen from a predetermined observation position may include a mosaic of a plurality of pixels 35b and black matrices BM. That is, a plurality of images that are divided along the axial direction of the polygonal prism lenses 120a may be seen through the polygonal prism lenses 120a. Thus, the pixels 35b may be arranged such that a pair of horizontally adjacent pixels 35b can be aligned with each other along the direction perpendicular to the axial direction of the polygonal prism lenses 120a, and that a pair of vertically adjacent pixels 35b can be slightly misaligned with each other along the axial direction of the polygonal prism lenses 120a. Then, none of the images divided along the axial direction of the polygonal prism lenses 120a may render black matrices BM only. Therefore, it is possible to reduce or effectively prevent only the black matrices BM from being seen through the polygonal prism lenses 120a, and thus to reduce or effectively prevent the occurrence of a black matrix moire phenomenon.

Figure 7:
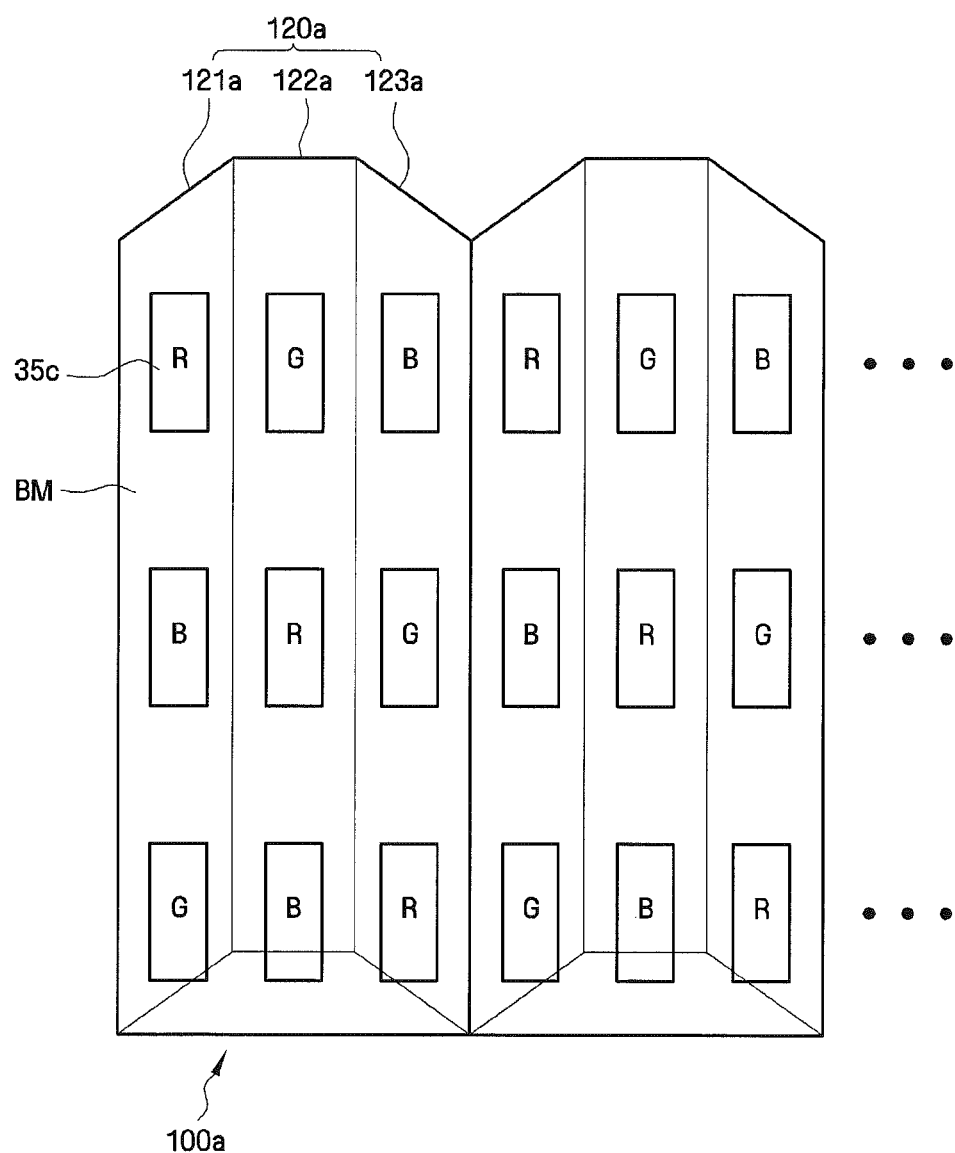
FIG. 7 illustrates a plan view of another exemplary embodiment of a portion of the lenticular sheet of the display device according to the present invention, and a plurality of pixels that underlie the lenticular sheet.

Another exemplary embodiment of the display device according to the present invention will hereinafter be described in detail with reference to FIG. 7. FIG. 7 illustrates a plan view of part of another exemplary embodiment of a portion of the lenticular sheet 100a of the display device 1 according to the present invention, and a plurality of pixels 35c that underlie the lenticular sheet 100a. In FIGS. 1 through 4C and 7, like reference numerals indicate like elements, and thus, detailed descriptions thereof will be skipped.

Referring to FIG. 7, a plurality of pixels 35c are arranged in a matrix below the lenticular sheet 100a such that a pair of adjacent pixels 35c can represent different colors, and that a mosaic of colors can be provided. In the vertical and horizontal directions of the plan view, adjacent pixels 35c are aligned. That is, the adjacent pixels 35c are aligned both in the axial direction and the direction perpendicular to the axial direction of the polygonal prism lenses 120a. In this manner, it is possible to reduce or effectively prevent a certain color from appearing dominant, and reduce or effectively prevent the occurrence of color bleeding.

Alternatively, the pixels 35c may be arranged in a zigzag manner along the axial direction of a plurality of polygonal prism lenses 120a of the lenticular sheet 100a. In this manner, it is also possible to reduce or effectively prevent color bleeding and a black matrix moire phenomenon.

Another exemplary embodiment of the display device according to the present invention will hereinafter be described in detail with reference to FIGS. 8A and 8B.

Figure 8A:
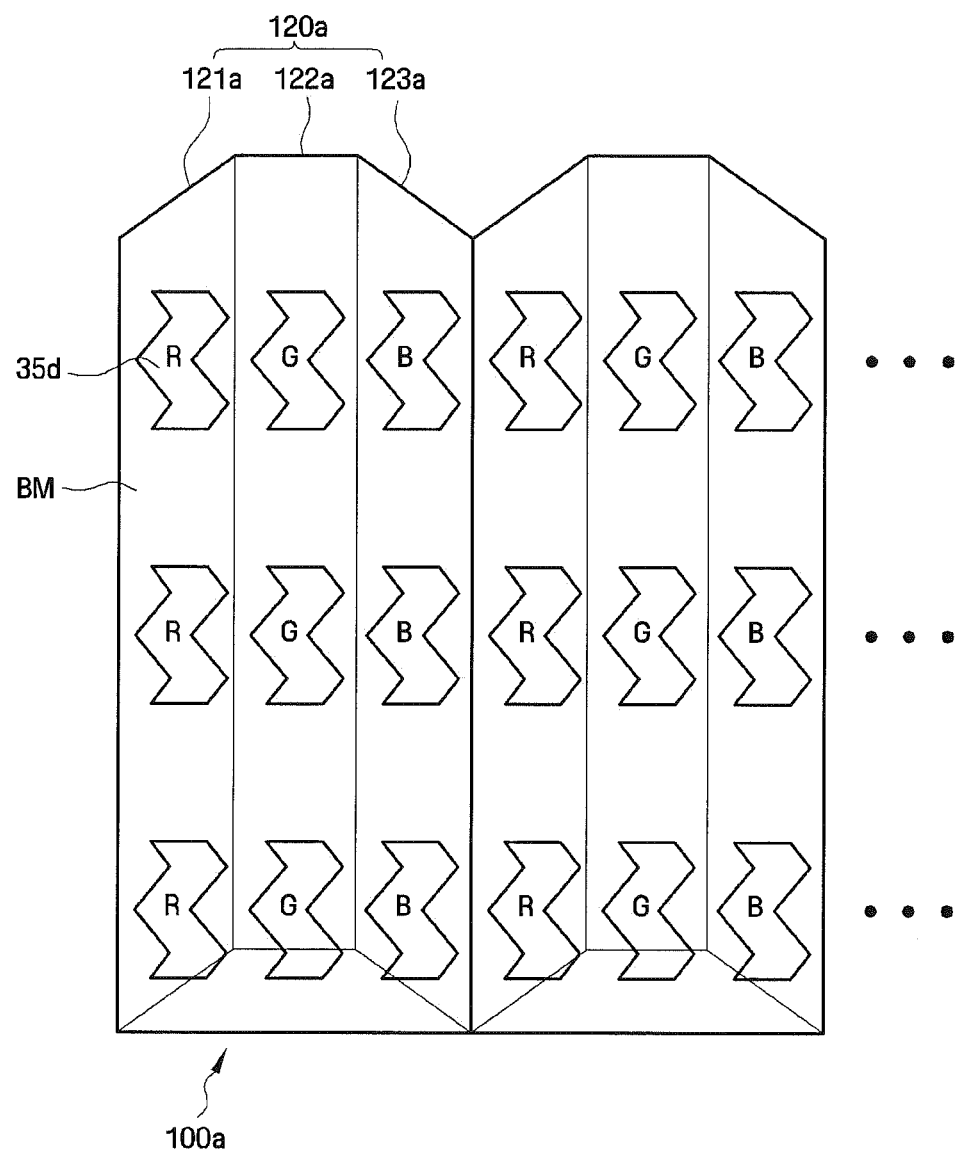
FIG. 8A illustrates a plan view of another exemplary embodiment of a portion of the lenticular sheet of the display device according to the present invention, and a plurality of pixels that underlie the lenticular sheet.
Figure 8B:
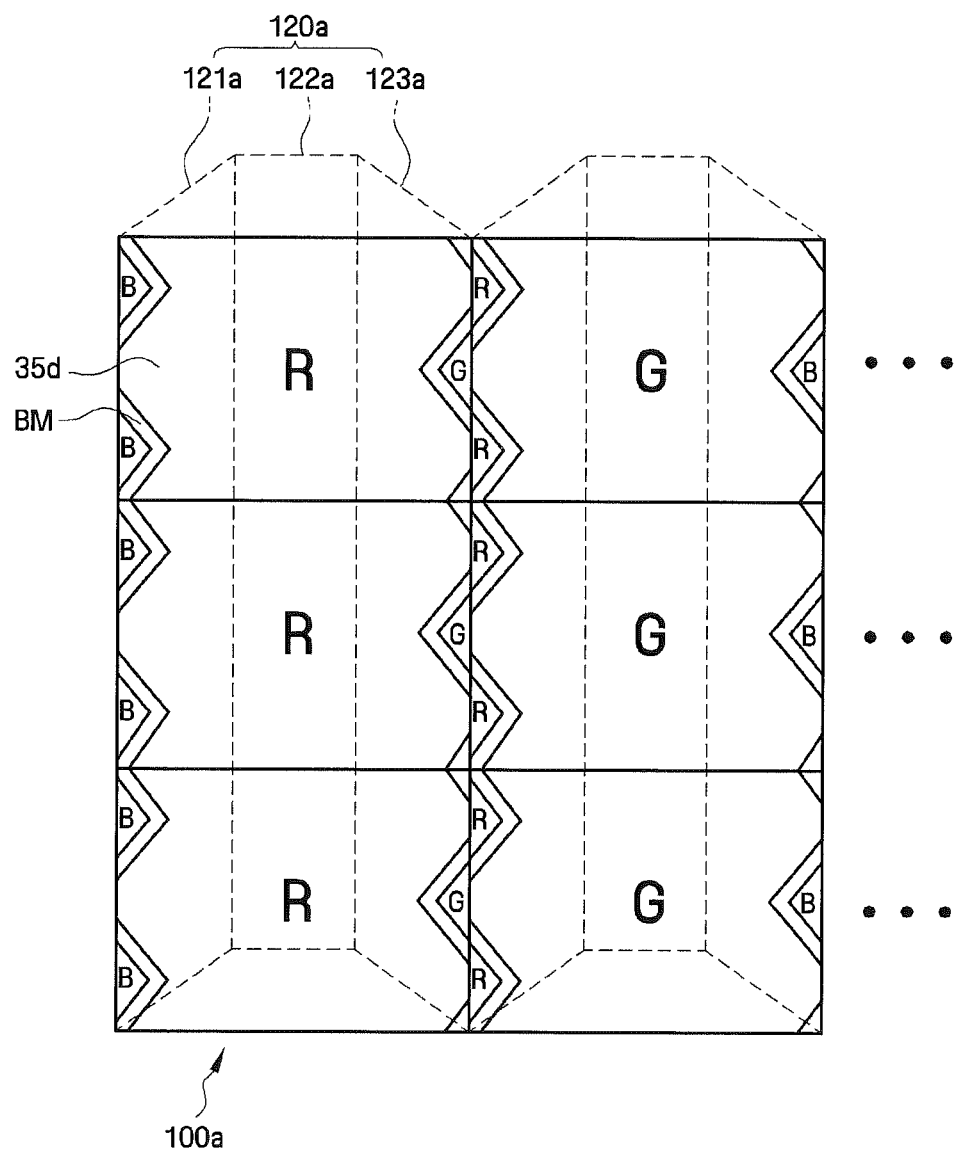
FIG. 8B illustrates a diagram for explaining what a plurality of pixels look like to the naked eye of a viewer when being viewed through the lenticular sheet shown in FIG. 8A.

FIG. 8A illustrates a plan view of part of another exemplary embodiment of a portion of the lenticular sheet 100a of the display device 1 according to the present invention, and a plurality of pixels 35d that underlie the lenticular sheet 100a, and FIG. 8B illustrates a diagram for explaining what a plurality of pixels 35d look like to the naked eye of a viewer when being viewed through the lenticular sheet 100a illustrated in FIG. 8A. In FIGS. 1 through 4C, 8A and 8B, like reference numerals indicate like elements, and thus, detailed descriptions thereof will be skipped.

In the embodiment of FIGS. 8A and 8B, a plurality of pixels 35a include edges that are bent twice in a zigzag manner, in the plan view.

More specifically, referring to FIG. 8A, the pixels 35d include edges that may be bent twice in a zigzag manner along the axial direction of a plurality of polygonal prism lenses 120a of the lenticular sheet 100a. The bent edges of the pixels 35d may form a predetermined angle with the axial direction of the polygonal prism lenses 120a. Alternatively, the edges of the pixels 35d may be bent twice in a zigzag manner along a direction other than the axial direction of the polygonal prism lenses 120a.

FIG. 8B illustrates a diagram for explaining what the pixels 35d look like when being viewed from a predetermined observation point through the polygonal prism lenses 120a illustrated in FIG. 8A. Referring to FIG. 8B, each of the pixels 35d appears to be large enough to have the same width as that of the polygonal prism lenses 120a when being viewed through the lenticular sheet 100a illustrated in FIG. 8A. More specifically, the pixels 35d including edges which are formed as zigzag patterns, may be seen through the lenticular sheet 100a as being wider they actually are. In addition, a pair of horizontally adjacent pixels 35d may be seen through the lenticular sheet 100a as partially overlapping each other. Thus, an image that can be seen from a predetermined observation position may include a number of pixels 35d corresponding to a main image, black matrices BM and pixels 35d adjacent to the pixels 35d corresponding to the main image. In this case, the pixels 35d corresponding to the main image account for most of the image that can be seen from the predetermined observation position, and the black matrices BM and the adjacent to the pixels 35d corresponding to the main image account for only a small portion of the image that can be seen from the predetermined observation position.

In short, in the embodiment of FIGS. 8A and 8B, the pixels 35d includes edges that are bent twice in a zigzag manner along the axial direction of the polygonal prism lenses 120a of the lenticular sheet 100a. Thus, it is possible to reduce or effectively prevent the occurrence of a black matrix moire phenomenon. In addition, in the embodiment of FIGS. 8A and 8B, a number of pixels 35d corresponding to a main image are seen through the lenticular sheet 100a as being partially overlapped by their respective adjacent pixels 35d. Thus, it is possible to smoothly switch image frames, improve stereoscopic perception, and realize realistic moving images.

The axial direction of the polygonal prism lenses 120a may form an acute angle with the pixels 35d, and the bent edges of the pixels 35d. In this case, it is possible to reduce or effectively prevent the occurrence of a black matrix moire phenomenon and color bleeding. This will be hereinafter described in detail with reference to FIGS. 11A to 13.

As described above, the polygonal prism lenses having a plurality of flat surfaces are illustrated in FIGS. 5A, 5B and 5D. Particularly, FIGS. 5B and 5D illustrate the polygonal prism lenses in which a plurality of curved surfaces are mixed with a plurality of flat surfaces. Hereinafter, the polygonal prism lenses in which a plurality of curved surfaces are mixed with a plurality of flat surfaces are also referred to as hybrid lenses. As described above, the black matrix moire phenomenon can be reduced or effectively prevented by using the polygonal prism lenses shown in FIGS. 5A, 5B and 5D. This will be hereinafter described in more detail with reference to FIG. 10.

Figure 10:
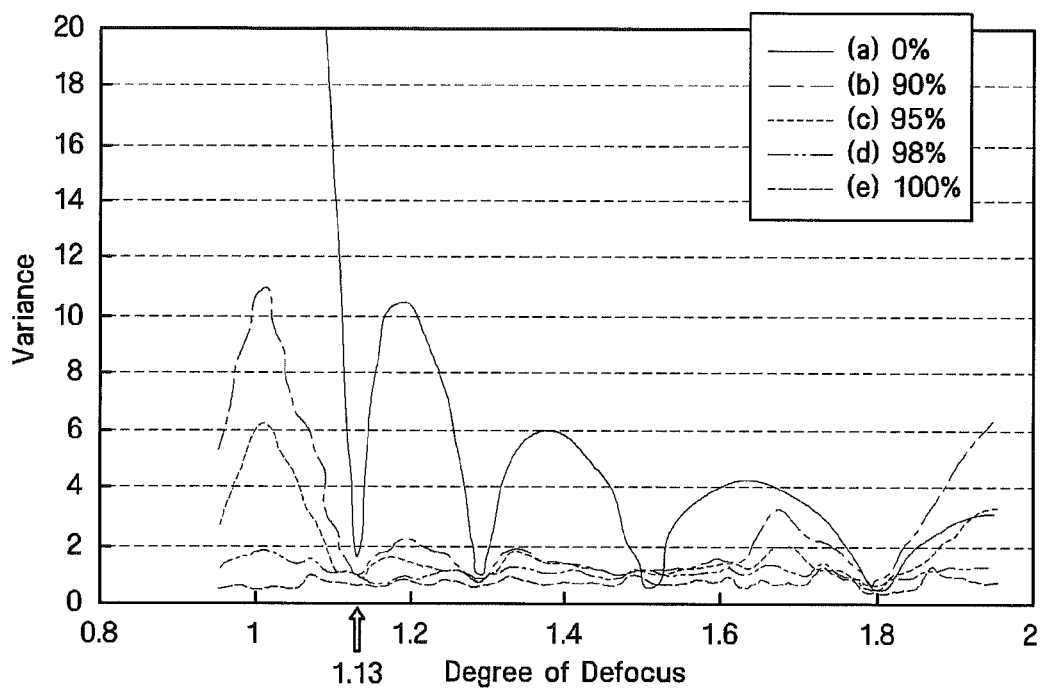
FIG. 10 is a graph showing variance of luminance according to a ratio of flat surfaces to the entire surface of a polygonal prism lens.

FIG. 10 is a graph showing variance of luminance according to a ratio of flat surfaces to the entire surface of the polygonal prism lens. Specifically, in the graph of FIG. 10, a horizontal axis represents degree of defocus, and a vertical axis represents variance of luminance.

The degree of defocus represents a ratio of a focal distance of the polygonal prism lens to a distance between the polygonal prism lens and the pixel (Focal distance of the lens/Distance between the lens and the pixel). Accordingly, when the focal distance of the lens is equal to the distance between the lens and the pixel, the degree of defocus is 1. When the focal distance of the lens is greater than the distance between the lens and the pixel, the degree of defocus is greater than 1.

Further, the variance of luminance is associated with the black matrix moire phenomenon. That is, the fact that the variance of luminance has a small value means that the black matrix moire phenomenon decreases, and the fact that the variance of luminance has a large value means that the black matrix moire phenomenon increases.

The graph of FIG. 10 shows a relationship between the variance of luminance and the degree of defocus when the ratio of flat surfaces to the entire surface of the polygonal prism lens is 0%, about 90%, about 95%, about 98% and about 100%.

A case where the ratio of flat surfaces to the entire surface of the polygonal prism lens is 0% means that the polygonal prism lens includes only curved surfaces. A case where the ratio of flat surfaces to the entire surface of the polygonal prism lens is 90% means that the polygonal prism lens includes flat surfaces of about 90% and curved surfaces of about 10%. Further, a case where the ratio of flat surfaces to the entire surface of the polygonal prism lens is 100% means that the polygonal prism lens includes only flat surfaces as in FIG. 5A. The ratio of flat surfaces of the polygonal prism lens to the entire surface of the polygonal prism lens may be adjusted by modifying the width or the number of flat surfaces included in the polygonal prism lens.

Referring to FIG. 10, it can be seen that when the ratio of flat surfaces of the polygonal prism lens to the entire surface of the polygonal prism lens is 0% (see (a)), the variance of luminance largely fluctuates according to the degree of defocus. In a case of (a), the degree of defocus is about 1.13 (indicated by an arrow) when the variance of luminance has a minimum value. That is, in case of (a), because the degree of defocus minimizing the variance of luminance is fixed, the focal distance of the polygonal prism lens needs to be fixed to satisfy the above condition. Consequently, the black matrix moire phenomenon depends on the focal distance of the polygonal prism lens.

In contrast, it can be seen that when the ratio of flat surfaces of the polygonal prism lens to the entire surface of the polygonal prism lens is increased to about 90% or more (see (b) to (e)), fluctuation of the variance of luminance according to the degree of defocus is reduced. Particularly, for example, it can be seen that the variance of luminance hardly changes when the ratio of flat surfaces of the polygonal prism lens to the entire surface of the polygonal prism lens is about 90% or more and the degree of defocus is equal to or larger than 1.2.

Particularly, it can be seen that when the ratio of flat surfaces of the polygonal prism lens to the entire surface of the polygonal prism lens is about 98% (see (d)) and about 100% (see (e)), the variance of luminance is constantly maintained regardless of the degree of defocus. This means that the black matrix moire phenomenon can be reduced regardless of the focal distance of the polygonal prism lens in case of (d) and (e).

Consequently, when the ratio of flat surfaces of the polygonal prism lens to the entire surface of the polygonal prism lens is equal to or larger than about 90%, it is possible to reduce the black matrix moire phenomenon. More preferably, when the ratio of flat surfaces of the polygonal prism lens to the entire surface of the polygonal prism lens is equal to or larger than about 98%, it is possible to minimize the black matrix moire phenomenon regardless of the degree of defocus, e.g., the focal distance.

In order to enhance the quality of a 3D image, it is required to not only improve the uniformity of the distribution of luminance by minimizing the black matrix moire phenomenon, but also reduce occurrence of three-dimensional (3D) image crossing, to address the earlier described particular problems with which the invention is concerned. However, reducing or preventing the black matrix moire phenomenon means that there is an overlap between images at a portion where the black matrix is positioned. On the other hand, the 3D image crossing increases as the overlap between images increases. Accordingly, the 3D image crossing decreases as the black matrix moire phenomenon increases, whereas the 3D image crossing increases as the black matrix moire phenomenon decreases. That is, the black matrix moire phenomenon and the 3D image crossing have a trade-off relationship.

Accordingly, the present invention provides an optimal structure capable of reducing or effectively preventing the 3D image crossing, while minimizing the black matrix moire phenomenon. This will be described below with reference to FIGS. 11A to 11D.

Figure 11A:
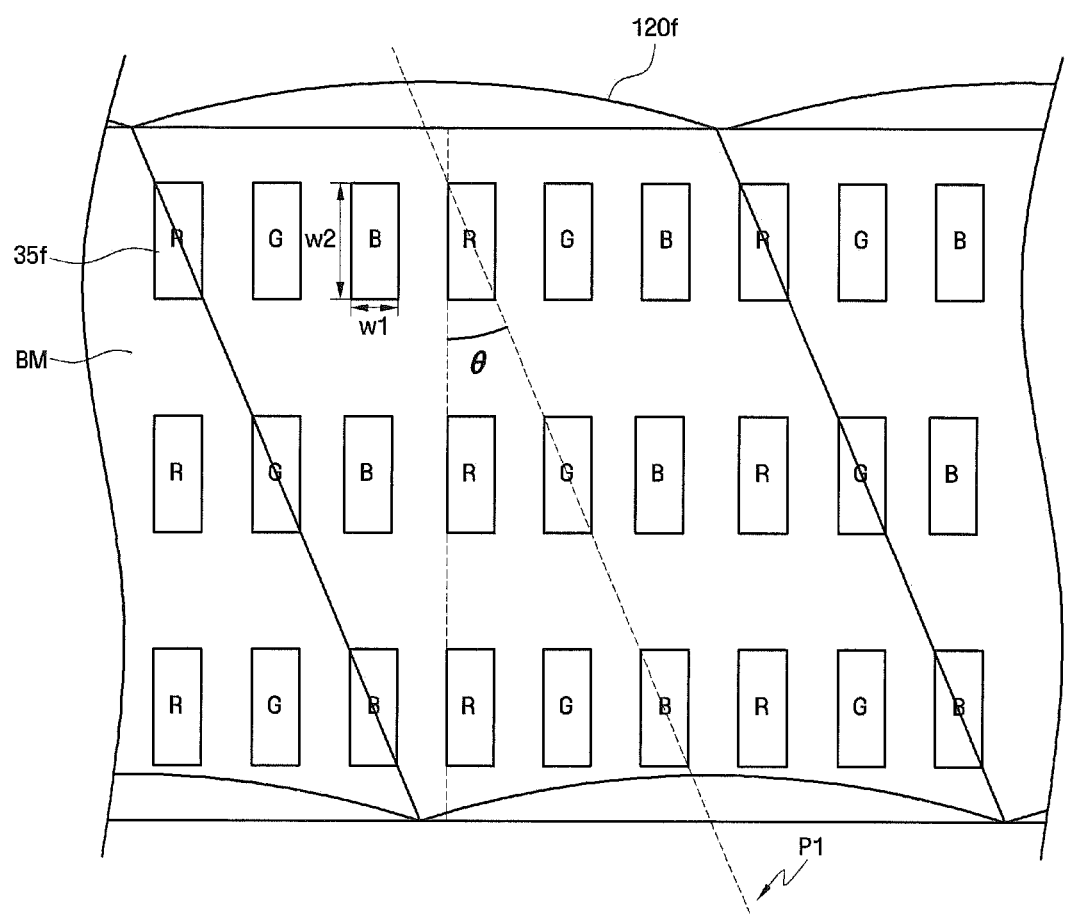
FIG. 11A shows a partial plan view of another exemplary embodiment of pixels and a lenticular sheet included in a display device according to the present invention.
Figure 11B:
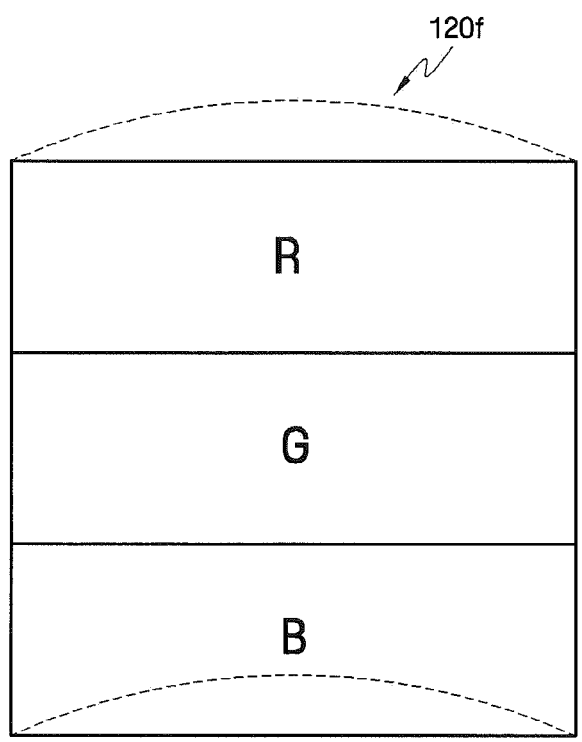
FIG. 11B shows a partial view of the pixel seen with the naked eye when viewed from the lenticular sheet of FIG. 11A.
Figure 11C:
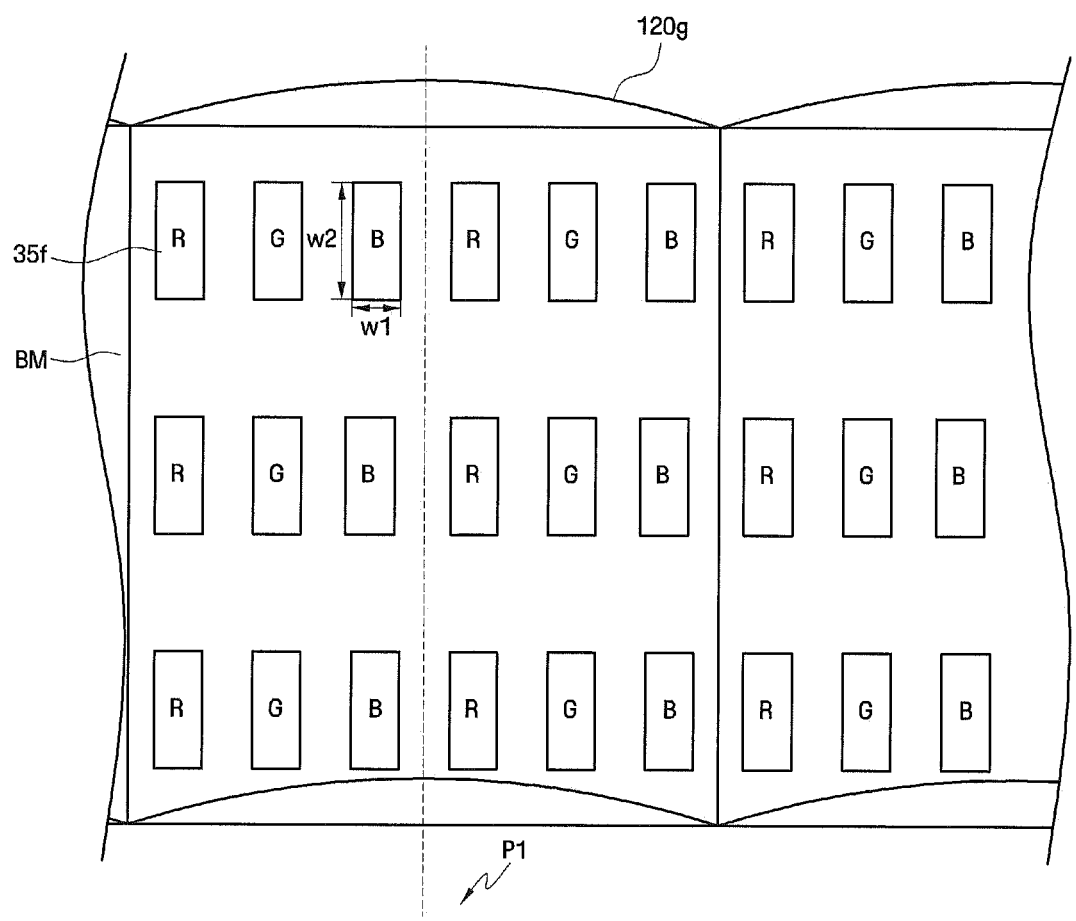
FIGS. 11C and 11D show partial views of pixels and a lenticular sheet in comparative examples, for comparison with the display device of FIGS. 11A and 11B.
Figure 11D:
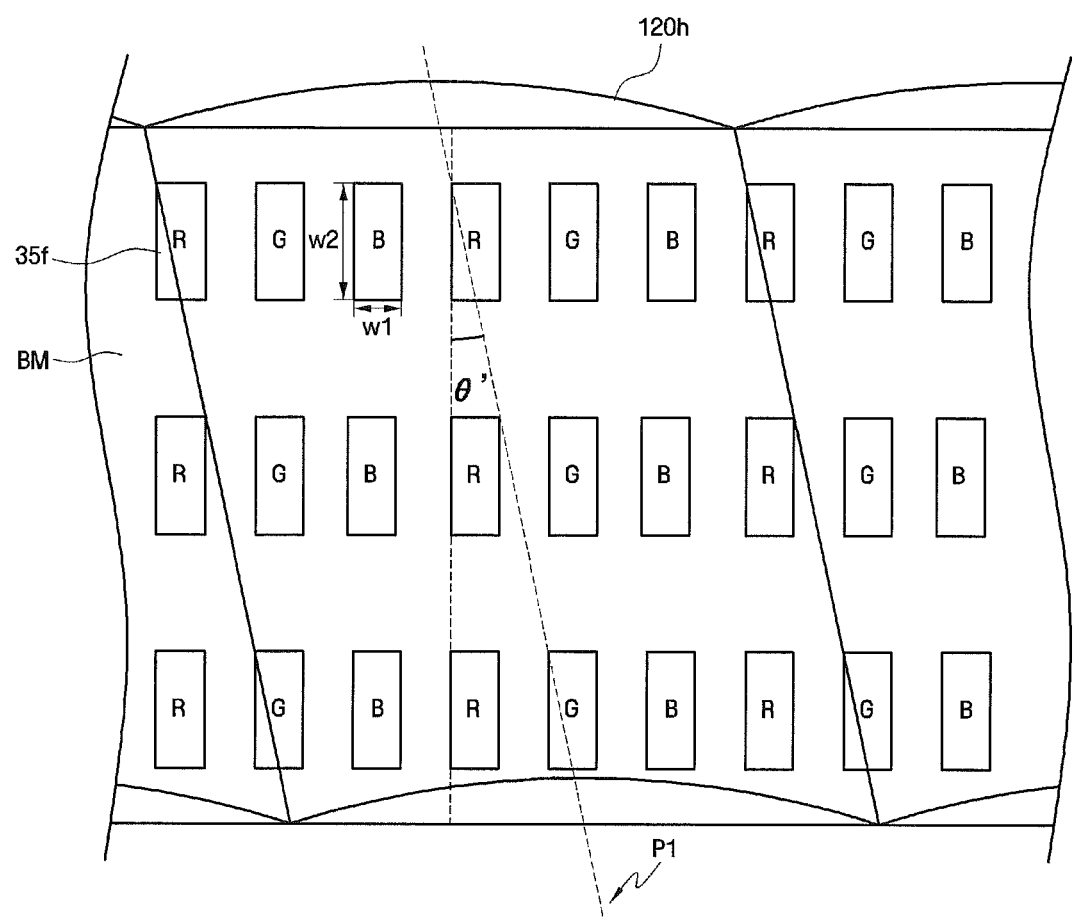

FIG. 11A shows a partial plan view of another exemplary embodiment of pixels and a lenticular sheet included in the display device 1 according to the present invention. FIG. 11B shows a partial view of the pixel seen with the naked eye when viewed from the lenticular sheet of FIG. 11A. FIGS. 11C and 11D show partial views of pixels and a lenticular sheet in comparative examples for comparison with the display device of FIGS. 11A and 11B.

First, referring to FIG. 11A, pixels 35$f$ of the illustrated embodiment are regularly arranged in a matrix in horizontal and vertical directions. Each of the pixels 35$f$ may represent one of red (R), green (G) and blue (B). In this case, each of the pixels 35$f$ has a quadrilateral planar shape (e.g., a rectangular shape) including two linear sides parallel to a horizontal direction and two linear sides parallel to a vertical direction. A width of each of the pixels 35$f$ in the horizontal direction is denoted by w1 and a width of each of the pixels 35$f$ in the vertical direction is denoted by w2. In the illustrated embodiment, a ratio of the horizontal width w1 of the pixel 35$f$ to the vertical width w2 of the pixel 35$f$ may be about 1:3. However, the present invention is not limited thereto, and the ratio of the horizontal width w1 to the vertical width w2 may be modified.

Let a plurality of pixels 35$f$ arranged in a line in the vertical direction to be a column of pixels 35$f$. In a first column of pixels 35$f$, let one of the pixels 35$f$ be a specific pixel 35$f$. In the illustrated embodiment, the pixels 35$f$ included in the column of the specific pixel 35$f$ represent the same color. The color of the pixels 35$f$ included in the column of the specific pixel 35$f$ is different from a color of the pixels 35$f$ included in a column of pixels 35$f$ adjacent to the specific pixel 35$f$. In other words, the pixel 35$f$ adjacent the specific pixel 35$f$ in the vertical direction (e.g., in the first column) has the same color as that of the specific pixel 35$f$, whereas the pixel 35$f$ adjacent the specific pixel 35$f$ in the horizontal direction has a color different from that of the specific pixel 35$f$. However, the present invention is not limited thereto, and the pixels 35$f$ may represent colors in various ways.

A lenticular sheet having polygonal prism lenses 120$f$ is disposed on the pixels 35$f$. The pixels 35$f$ may be observed through the polygonal prism lenses 120$f$ on the lenticular sheet.

The polygonal prism lenses 120$f$ may be hybrid lenses having curved surfaces and flat surfaces, or lenses having only flat surfaces. Particularly, the polygonal prism lenses 120$f$ may be lenses having a ratio of flat surfaces to the entire surface of the polygonal prism lens, which is equal to or larger than about 90%, more preferably, equal to or larger than about 98%. In the illustrated embodiment, the polygonal prism lenses 120$f$ have substantially the same shape as that of the polygonal prism lens 120$e$ of FIG. 5D. Accordingly, each of the polygonal prism lenses 120$f$ may include five flat surfaces 121$f$, 123$f$, 125$f$, 127$f$ and 129$f$, and four curved surfaces 122$f$, 124$f$, 126$f$ and 128$f$. However, the present invention is not limited thereto, and the polygonal prism lens 120$f$ may have substantially the same shape as that of the polygonal prism lens 120$b$ of FIG. 5A or the polygonal prism lens 120$c$ of FIG. 5B. Alternatively, the polygonal prism lens 120$f$ may have another shape including only flat surfaces, or another shape including flat surfaces and curved surfaces.

Further, the curved surface and the flat surfaces included in the polygonal prism lens 120$f$ may satisfy the above-described arrangement condition. That is, the polygonal prism lens 120$f$ may include two or more flat surfaces and curved surfaces arranged alternately with the flat surfaces. A width W of the flat surfaces, a radius of curvature R of the curved surfaces, an angle AF between normal lines of adjacent flat surfaces, and the like may be constant. Further, the normal lines PL of the flat surfaces and a center of rotation of the curved surfaces converge into one point. The polygonal prism lens 120$f$ may have a symmetrical structure with respect to a center of the lens 120$f$ in a horizontal direction perpendicular to an axial direction of the lens.

In the illustrated embodiment of FIG. 11A, the polygonal prism lens 120$f$ is arranged obliquely such that a predetermined angle θ is formed between an axial direction of the polygonal prism lens 120$f$, and the vertical direction of the pixels 35$f$, in the plan view. Particularly, the polygonal prism lens 120$f$ is arranged such that a line parallel to the axial direction of the polygonal prism lens 120$f$ substantially traverses the pixels 35$f$ in a diagonal direction. That is, the axial direction of the polygonal prism lens 120$f$ aligns with the diagonals of pixels 35$f$ themselves arranged in an inclined direction. The fact that a line parallel to the axial direction of the polygonal prism lens 120$f$ substantially traverses the pixels 35$f$ in a diagonal direction means that the angle θ and the horizontal width w1 and the vertical width w2 of the pixels 35f substantially have a relationship as expressed in Eq. 1.

$$\tan(\theta) = w1/w2 \qquad \text{Eq. 1}$$

As described above, in the illustrated embodiment, if a ratio of the horizontal width w1 of the pixel 35f to the vertical width w2 of the pixel 35f is about 1:3, tan (θ) may be ⅓.

An image observed through the polygonal prism lenses 120f, which are arranged to be longitudinally inclined with respect to the vertical direction of the pixels 35f by a specific angle as described above, is illustrated in FIG. 11B.

FIG. 11B shows an image perceived when the polygonal prism lens 120f is viewed from, specific position, e.g., a position P1 indicated by a dotted line of FIG. 11A. Referring to FIG. 11B, one pixel 35f is observed in a full shape on a screen divided in the axial direction of the polygonal prism lens 120f. In one exemplary embodiment, for example, the R, G and B pixels may be observed in a full shape on three screens divided in the axial direction of the polygonal prism lens 120f.

As described above, in case where the polygonal prism lens 120f is arranged to be inclined with respect to the vertical direction of the pixels 35f by a predetermined angle θ and to substantially satisfy Eq. 1, it is possible to reduce the black matrix moire phenomenon and also improve the 3D image crossing. This will be explained later with reference to FIGS. 12 and 13.

FIGS. 11C and 11D show comparative examples for comparison with the display device of FIGS. 11A and 11B of the present invention. The pixels and polygonal prism lens of the comparative examples are substantially the same as the pixels 35f and the polygonal prism lens 120f included in the display device of FIGS. 11A and 11B of the present invention, except for an angle θ between the axial direction of the polygonal prism lens and the vertical direction of pixels. Accordingly, the following description will be given focusing on differences between the comparative examples of FIGS. 11C and 11D and the exemplary embodiment illustrated in FIGS. 11A and 11B.

Referring to FIG. 11C, a lenticular sheet with polygonal prism lenses 120g is arranged above the pixels 35f, arranged in the same way as in FIGS. 11A and 11B. The axial direction of the polygonal prism lens 120g is substantially parallel to the vertical direction of the pixels 35f. That is, an angle θ between the axial direction of the polygonal prism lens 120g and the vertical direction of the pixels 35f is zero. Except for this, the polygonal prism lens 120g may have substantially the same shape as the polygonal prism lens 120f of FIGS. 11A and 11B of the present invention.

Referring to FIG. 11D, a lenticular sheet with polygonal prism lenses 120h is arranged above the pixels 35f arranged in the same way as in FIGS. 11A and 11B. In this case, an angle θ' between the axial direction of the polygonal prism lens 120h and the vertical direction of the pixels 35f is smaller than the angle θ between the axial direction of the polygonal prism lens 120f and the vertical direction of the pixels 35f as described in FIGS. 11A and 11B. In this illustrated embodiment, the axial direction of the polygonal prism lens 120f does not align with the diagonals of pixels 35f themselves arranged in an inclined direction, in contrast to FIG. 11A.

That is, the angle θ' has a value satisfying Eq. 2 below. Except for this, the polygonal prism lens 120h may have substantially the same shape as the polygonal prism lens 120f of FIGS. 11A and 11B of the present invention.

$$\tan(\theta') < w1/w2 \qquad \text{Eq. 2}$$

As described above, in FIGS. 11A and 11B, the ratio of the horizontal width w1 of the pixel 35f to the vertical width w2 of the pixel 35f is about 1:3, and the angle θ between the axial direction of the polygonal prism lens 120f and the vertical direction of the pixels 35f satisfies tan (θ)=⅓. In the illustrated embodiment of FIG. 11D, the angle θ' between the axial direction of the polygonal prism lens 120h and the vertical direction of the pixels 35f may satisfy tan (θ')=⅙.

In case where the angle between the axial direction of the polygonal prism lens and the vertical direction of the pixels is modified as in the comparative examples of FIGS. 11C and 11D, the black matrix moire phenomenon or the 3D image crossing increases compared to FIGS. 11A and 11B of the present invention. This will be described in detail with reference to FIGS. 12 and 13.

Figure 12:
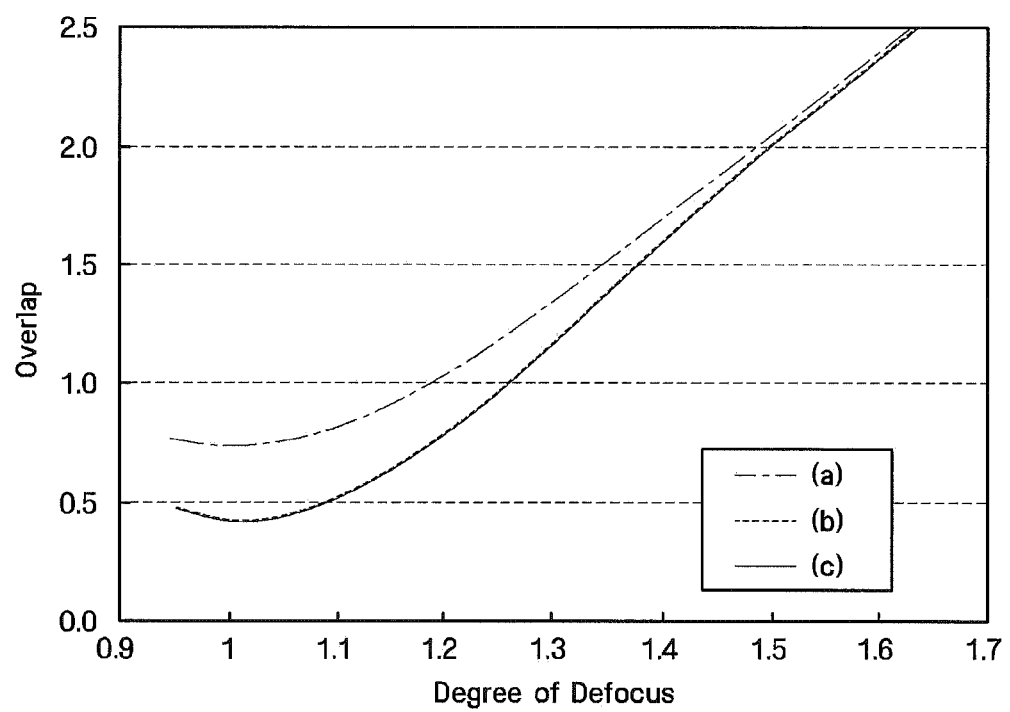
FIG. 12 is a graph showing an overlap between images according to an angle between an axial direction of the polygonal prism lens and a vertical direction of the pixels.
Figure 13:
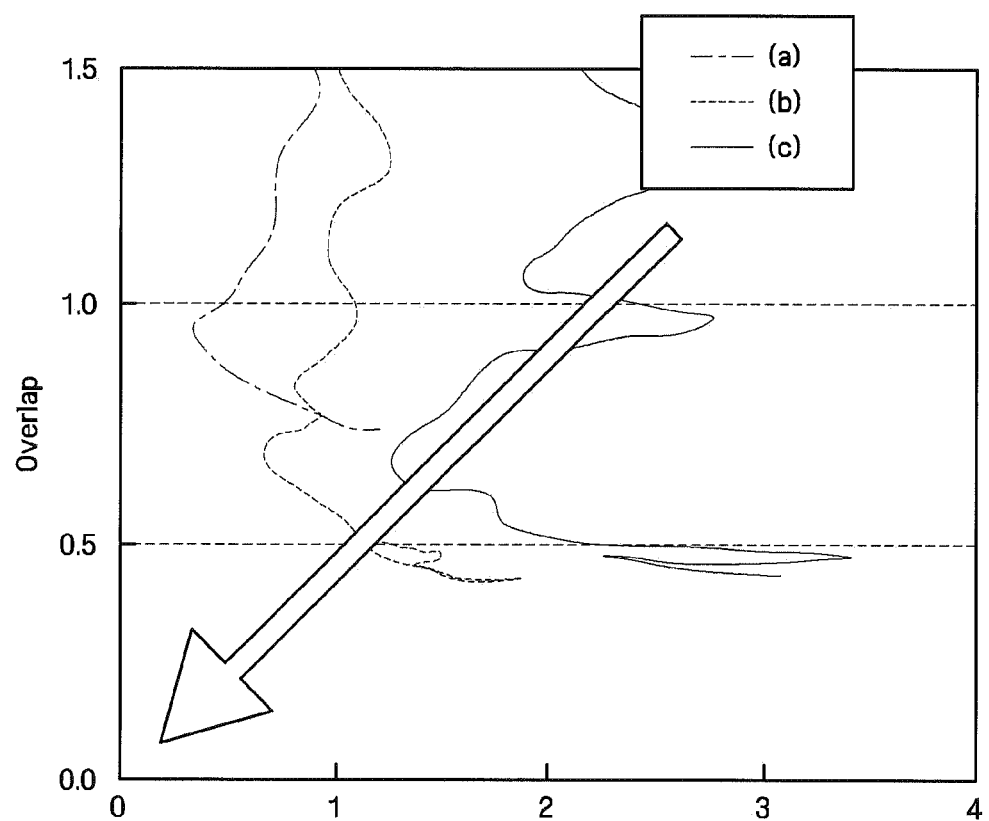
FIG. 13 is a graph showing both an overlap between images and variance of luminance, according to the angle between the axial direction of the polygonal prism lens and the vertical direction of the pixels.

FIGS. 12 and 13 are diagrams for explaining an effect which can be obtained in the display device 1 in accordance with FIGS. 11A and 11B of the present invention. FIG. 12 is a graph showing an overlap between images according to the angle between the axial direction of the polygonal prism lens and the vertical direction of the pixels. FIG. 13 is a graph showing both an overlap between images and variance of luminance according to the angle between the axial direction of the polygonal prism lens and the vertical direction of the pixels. Specifically, in the graph of FIG. 12, a horizontal axis represents degree of defocus, and a vertical axis represents an overlap between images. Further, in the graph of FIG. 13, a horizontal axis represents variance of luminance, and a vertical axis represents an overlap between images.

The graphs of FIGS. 12 and 13 show the results of measuring an overlap between images and variance of luminance while varying only an inclination of the polygonal prism lens, when a ratio of flat surfaces of the polygonal prism lens is about 98%. Further, these graphs are obtained when the ratio of the horizontal width w1 to the vertical width w2 of the pixels under the lenticular sheet is about 1:3.

Further, in FIGS. 12 and 13, a case of (b) shows an overlap between images and variance of luminance when the polygonal prism lens is arranged such that a line parallel to the axial direction of the polygonal prism lens traverses the pixels in a diagonal direction, e.g., when the angle θ between the axial direction of the polygonal prism lens and the vertical direction of the pixels satisfies tan (θ)=⅓ as illustrated in FIG. 11A. Further, a case of (c) shows an overlap between images and variance of luminance when the axial direction of the polygonal prism lens is parallel to the vertical direction of the pixels and perpendicular to the horizontal direction of the pixels as illustrated in FIG. 11C. Further, a case of (a) shows an overlap between images and variance of luminance when the angle θ' between the axial direction of the polygonal prism lens and the vertical direction of the pixels satisfies tan (θ')=⅙ as illustrated in FIG. 11D.

First, referring to FIG. 12, an overlap between images is higher in a case of (a) than in cases of (b) and (c). This means that the 3D image crossing is larger.

Accordingly, it can be seen that the 3D image crossing is improved in case of (b) and (c), e.g., when the axial direction of the polygonal prism lens traverses the pixels in a diagonal direction or when the axial direction of the polygonal prism lens is parallel to the vertical direction of the pixels.

Next, referring to FIG. 13, in case of (a), the 3D image crossing is very large and commercialization is impossible. Comparing cases (b) and (c) having similar 3D image crossing, it can be seen that variance of luminance is lower in a case of (b) than in a case of (c). That is, the black matrix moire phenomenon is more improved while maintaining similar 3D image crossing in case of (b) than in case of (c).

Consequentially, in case of (b), e.g., when a line parallel to the axial direction of the polygonal prism lens traverses the pixels in a diagonal direction, it is possible not only to improve the 3D image crossing, but also to minimize the black matrix moire phenomenon.

Another exemplary embodiment of a display device according to the present invention will hereinafter be described in detail with reference to FIG. 9.

Figure 9:
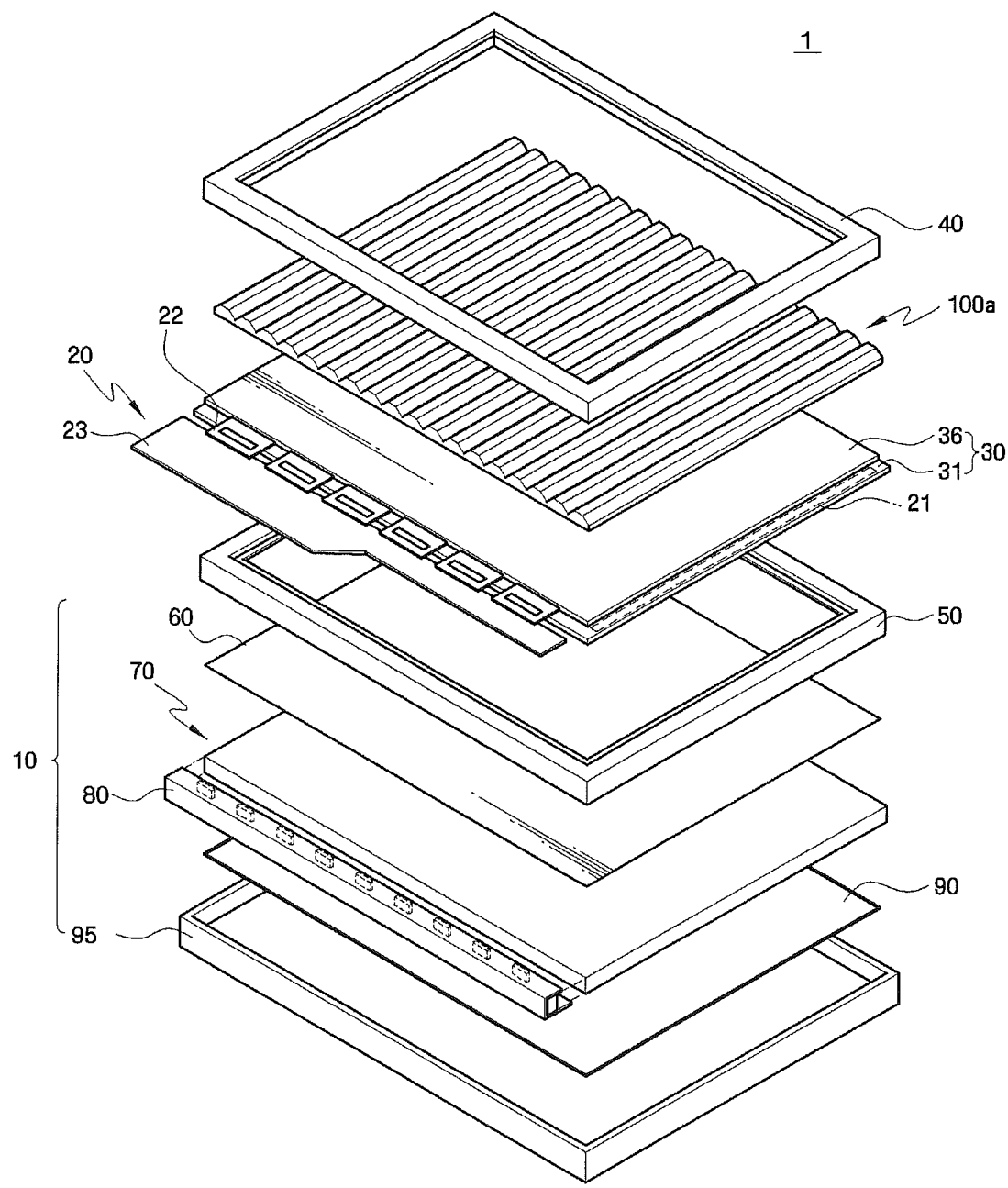
FIG. 9 illustrates a detailed exploded perspective view of another exemplary embodiment of a display device according to an embodiment of the present invention.

FIG. 9 illustrates an exploded perspective view of another exemplary embodiment of a display device 1' according to the present invention. The display device 1' in accordance with the embodiment of the present invention includes the lenticular sheet 100a of FIGS. 1-5D. However, the present invention is not limited thereto, and the display device 1' may include any one of the lenticular sheets of the above-described embodiments (e.g., FIGS. 6-8B, 11A and 11B).

Referring to FIG. 9, the display device 1' may include a lower display panel 31, on which a thin-film transistor ("TFT") array is formed, an upper display panel 36, which faces the lower display panel 31, and a liquid crystal layer (not shown), which is interposed between the lower display panel 31 and the upper display panel 36.

The display device 1' may also include a lenticular sheet 100a, a display panel assembly 20, a backlight assembly 10, a middle frame 50, an upper container 40 and a lower container 95.

The display panel assembly 20 includes the display panel 30, which includes the lower and upper display panels 31 and 36, the liquid crystal layer, a gate driving integrated circuit ("IC") 21, a plurality of data tape carrier packages ("TCPs") 22, and a printed circuit board ("PCB") 23.

The display panel 30 includes the lower display panel 31, on which a plurality of gate lines (not shown), a plurality of data lines (not shown), the TFT array, and a plurality of pixel electrodes are formed, and the upper display panel 36, on which a plurality of color filters, black matrices and a common electrode are formed. The upper display panel 36 faces the lower display panel 31. The color filters and the common electrode may be on the lower display panel 31, instead of being on the upper display panel 36. The lenticular sheet 100a, which includes a plurality of polygonal prism lenses 120a, may be on the display panel 30.

The gate driving IC 21 may be integrated on the lower display panel 31, and may be connected to the gate lines on the lower display panel 31. The data TCPs 22 may be connected to the data lines on the lower display panel 31. The data TCPs 22 may include tape automated bonding ("TAB") tapes, which connect a semiconductor chip to wiring patterns on a base film. Not only TCPs, but also chip-on-films ("COFs") may be used as chip film packages, but the present invention is not restricted to this.

Various driving elements for applying a gate driving signal to the gate driving IC 21, and applying a data driving signal to the data TCPs 22, may be mounted on the PCB 23.

The backlight assembly 10 includes one or more of an optical sheet 60, a light guide plate 70, one or more of a light source assembly 80 and a reflective sheet 90.

The light guide plate 70 guides light provided by the light source assembly 80 to the display panel assembly 20. The light guide plate 70 may include a transparent material such as a plastic material (e.g., acrylic plastic), and may enable light generated by the light source assembly 80 to proceed toward the display panel 30, which is disposed above the light guide plate 70 in a viewing direction of the display device 1'.

The light source assembly 80 provides light to the display panel 30. At least one light source assembly 80 may be included in the backlight assembly 10. Point light sources such as light-emitting diodes ("LEDs") may be used as light sources of the light source assembly 80.

The reflective sheet 90 is disposed on and facing a bottom surface of the light guide plate 70. The reflective sheet 90 reflects light emitted through a bottom of the light guide plate 70, back to the light guide plate 70 or to the display panel 30, through the light guide plate 70, thereby minimizing the loss of light emitted from the light source assembly 80 and improving the uniformity of light provided to the display panel 30 through the light guide plate 70.

The optical sheet 60 is disposed on and facing a top surface of the light guide plate 70. The optical sheet 60 diffuses and collects light incident thereupon from the light guide plate 70. A plurality of the optical sheet 60 may include at least one of a diffusion sheet, a polygonal prism sheet and a protective sheet. The diffusion sheet diffuses light incident thereupon from the light guide plate 70, thereby reducing or effectively preventing light from being concentrated on certain regions. The polygonal prism sheet may include an array of a plurality of polygonal prisms, and may collect light diffused by the diffusion sheet and emit the collected light toward a direction perpendicular to the display panel 30. Since most of the light transmitted through the polygonal prism sheet travels straight, the distribution of luminance of the protective sheet becomes uniform. The protective sheet not only uniformly distributes light from the polygonal prism sheet, but also protects the polygonal prism sheet from damage.

The reflective sheet 90, the light source assembly 80, the light guide plate 70, and the optical sheet 60 are sequentially contained in the lower container 95. The lower container 95 may include a metal material, such as the material of a chassis (not shown) in order to provide sufficient rigidity, and to serve as an electrical ground.

The middle frame 50 may be a rectangular frame having four sidewalls defining an open area therebetween. The middle frame 50 may be fixed to the lower container 95 when the display device 1' is assembled.

The display panel 30 is disposed on the optical sheet 60, and particularly, on the protective sheet of the plurality of optical sheets 60, and is accommodated in the middle frame 50. The middle frame 50 may include a plastic mold frame in order to prevent the breakdown of various elements of the display device 1' contained in the middle frame 50.

The upper container 40 may be coupled to the lower container 95 so as to cover a top surface or upper peripheral edges of the display panel 30, which is contained in the middle frame 50. The upper container 40 has a window, which is on the top surface of the upper container 40 and exposes the display panel 30. The upper container 40, like the lower container 95, may include a metal material such as the material of a chassis in order to provide sufficient rigidity, and to serve as an electrical ground. In one exemplary embodiment, the upper container 40 may be hook-coupled to the lower container 95.

The PCB 23 may be bent along an outer lateral surface of the middle frame 50, and may be settled on a lateral surface and/or a bottom surface of the lower container 95.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A display device comprising:
a display panel comprising a plurality of pixels arranged in a matrix in a first direction and in a second direction intersecting the first direction; and
a lenticular sheet which is disposed above the display panel, and includes a plurality of polygonal prism lenses arranged in the second direction,
wherein
each of the polygonal prism lenses longitudinally extends in a third direction intersecting the second direction, and includes a plurality of flat surfaces or curved surfaces,
a width of the flat surfaces is constant, and a radius of curvature of the curved surfaces is constant, and
normal lines of the flat surfaces converge into a center of rotation of the curved surfaces.

2. The display device of claim 1, wherein a ratio of the flat surfaces to an entire surface of each of the polygonal prism lenses is equal to or larger than about 90%.

3. The display device of claim 1, wherein the ratio of the flat surfaces to an entire surface of each of the polygonal prism lenses is equal to or larger than about 98%.

4. The display device of claim 1, wherein the third direction is parallel to the first direction.

5. The display device of claim 1, wherein the third direction is parallel to a diagonal direction of the pixels.

6. The display device of claim 1, wherein
adjacent pixels in the first direction represent the same color, and
adjacent pixels in the second direction represent different colors.

7. The display device of claim 1, wherein each of the polygonal prism lenses has a symmetrical structure with respect to a center thereof, in the second direction.

8. A display device comprising:
a display panel comprising a plurality of pixels are arranged in a matrix in a first direction and in a second direction intersecting the first direction; and
a lenticular sheet which is disposed above the display panel, and includes a plurality of polygonal prism lenses arranged in the second direction,
wherein
each of the polygonal prism lenses longitudinally extends in a third direction intersecting the second direction, and the third direction is parallel to a diagonal direction of the pixels,
a width of the flat surfaces is constant and a radius of curvature of the curved surfaces is constant, and
normal lines of the flat surfaces converge into a center of rotation of the curved surfaces.

9. The display device of claim 8, wherein
each of the polygonal prism lenses includes a plurality of flat surfaces or curved surfaces, and
a ratio of the flat surfaces to an entire surface of each of the polygonal prism lenses is equal to or larger than about 90%.

10. The display device of claim 9, wherein the ratio of the flat surfaces to an entire surface of each of the polygonal prism lenses is equal to or larger than about 98%.

11. The display device of claim 8, wherein
adjacent pixels in the first direction represent the same color, and
adjacent pixels in the second direction represent different colors.

12. The display device of claim 8, wherein each of the polygonal prism lenses has a symmetrical structure with respect to a center thereof, in the second direction.

13. A lenticular sheet comprising:
a base comprising an upper surface; and
a polygonal prism lens which is protruded from the upper surface of the base and is elongated in a specific direction,
wherein the protruded polygonal prism lens includes a plurality of alternating flat surfaces and curved surfaces each inclined with respect to the upper surface of the base in a cross-section of the protruded polygonal prism lens, elongated in the specific direction.

14. The lenticular sheet of claim 13, wherein a ratio of the flat surfaces to an entire surface of the polygonal prism lens is equal to or larger than about 90%.

15. The lenticular sheet of claim 14, wherein the ratio of the flat surfaces to an entire surface of the polygonal prism lens is equal to or larger than about 98%.

16. A lenticular sheet comprising:
a base; and
a polygonal prism lens which is disposed on the base and extends elongated in a specific direction,
wherein an extending direction of the polygonal prism lens is respectively parallel to diagonals of pixels of a display panel arranged under the lenticular sheet.

17. The lenticular sheet of claim 16, wherein
the polygonal prism lens includes a plurality of flat surfaces and curved surfaces extending in the specific direction, and
a ratio of the flat surfaces to an entire surface of the polygonal prism lens is equal to or larger than about 90%.

18. The lenticular sheet of claim 17, wherein the ratio of the flat surfaces to an entire surface of the polygonal prism lens is equal to or larger than about 98%.

19. The lenticular sheet of claim 13, wherein normal lines of the flat surfaces converge into a center of rotation of the curved surfaces.

20. The lenticular sheet of claim 17, wherein normal lines of the flat surfaces converge into a center of rotation of the curved surfaces.

* * * * *